US011861610B2

(12) United States Patent
Narasimhan et al.

(10) Patent No.: US 11,861,610 B2
(45) Date of Patent: Jan. 2, 2024

(54) PUBLIC LEDGER AUTHENTICATION SYSTEM

(71) Applicant: PayPal, Inc., San Jose, CA (US)

(72) Inventors: Srivathsan Narasimhan, San Jose, CA (US); Yashovardhana Samethanahalli Kote, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 200 days.

(21) Appl. No.: 17/188,991

(22) Filed: Mar. 1, 2021

(65) Prior Publication Data

US 2021/0295325 A1    Sep. 23, 2021

Related U.S. Application Data

(63) Continuation of application No. 15/195,030, filed on Jun. 28, 2016, now Pat. No. 10,937,069, which is a
(Continued)

(51) Int. Cl.
*G06Q 20/40* (2012.01)
*G06Q 20/06* (2012.01)
(Continued)

(52) U.S. Cl.
CPC .......... *G06Q 20/40* (2013.01); *G06Q 20/065* (2013.01); *G06Q 20/108* (2013.01);
(Continued)

(58) Field of Classification Search
CPC .......... G06Q 20/40–40975; G06Q 20/04–108; G06Q 30/0279; G06Q 2220/00;
(Continued)

(56) References Cited

U.S. PATENT DOCUMENTS 10,007,826 B2 * 6/2018 Ebrahimi ......... G06K 19/06112
10,438,197 B2 10/2019 Kote
(Continued)

FOREIGN PATENT DOCUMENTS

WO    WO 2017104899    6/2017
WO    WO 2017145020    8/2017

OTHER PUBLICATIONS

Van Oerle et al. "Distributed ledger technology for the financial industry", Robeco, May 2016, 30 pages (Year: 2016).*
(Continued)

*Primary Examiner* — James D Nigh
(74) *Attorney, Agent, or Firm* — Haynes and Boone, LLP

(57) ABSTRACT

Systems and methods for public ledger authentication includes receiving a first previous authentication public ledger address and a first current authentication public ledger address from a user. A verified static user key is identified in a public ledger using the first previous authentication public ledger address. A second current authentication public ledger address is then provided to the user for use in the current authentication attempt. Authentication attempt information is determined that includes a number of authentication attempts by the user, and used in a hash operation with the verified static user key to generate a first user authentication key. A second user authentication key is retrieved from the public ledger that was sent from the first current authentication public ledger address to the second current authentication public ledger address in a transaction, and the user is authenticated if the second user authentication key matches the first user authentication key.

20 Claims, 13 Drawing Sheets

Related U.S. Application Data continuation-in-part of application No. 15/098,079, filed on Apr. 13, 2016, now Pat. No. 10,438,197.

(51) Int. Cl.

| | |
|---|---|
| *G06Q 20/10* | (2012.01) |
| *G06Q 20/38* | (2012.01) |
| *H04L 9/32* | (2006.01) |
| *H04L 9/40* | (2022.01) |
| *G06Q 30/0279* | (2023.01) |
| *G06Q 30/02* | (2023.01) |
| *H04L 9/00* | (2022.01) |

(52) U.S. Cl.
CPC ..... *G06Q 20/3829* (2013.01); *G06Q 30/0279* (2013.01); *H04L 9/3236* (2013.01); *H04L 9/3242* (2013.01); *H04L 63/0421* (2013.01); *H04L 63/126* (2013.01); *G06Q 2220/00* (2013.01); *H04L 9/50* (2022.05); *H04L 2209/56* (2013.01)

(58) Field of Classification Search
CPC .......... G06Q 20/065; G06Q 20/3829; H04L 9/3236; H04L 9/3242; H04L 9/50; H04L 63/0421; H04L 63/126; H04L 2209/56
USPC .......................................... 705/71
See application file for complete search history.

(56) References Cited

U.S. PATENT DOCUMENTS

| | | | | |
|---|---|---|---|---|
| 10,915,969 | B2* | 2/2021 | Vieira | .................. G06Q 40/03 |
| 2004/0044627 | A1 | 3/2004 | Russell et al. | |
| 2006/0235761 | A1 | 10/2006 | Johnson | |
| 2009/0313165 | A1 | 12/2009 | Walter | |
| 2012/0240195 | A1 | 9/2012 | Weiss | |
| 2013/0061333 | A1 | 3/2013 | Davis et al. | |
| 2013/0282580 | A1 | 10/2013 | O'Brien et al. | |
| 2016/0080944 | A1 | 3/2016 | Colegate et al. | |
| 2016/0162897 | A1* | 6/2016 | Feeney | ................. H04L 9/3247 705/71 |
| 2016/0342977 | A1 | 11/2016 | Lam | |
| 2017/0111358 | A1* | 4/2017 | Hall | ..................... H04L 63/126 |
| 2017/0154331 | A1 | 6/2017 | Voorhees | |
| 2017/0243209 | A1 | 8/2017 | Johnsrud et al. | |
| 2018/0005186 | A1* | 1/2018 | Hunn | ..................... G06F 16/93 |
| 2018/0205537 | A1* | 7/2018 | Wilson | ...................... H04L 9/30 |
| 2018/0234241 | A1* | 8/2018 | Weimer | ................. H04L 9/3236 |
| 2018/0285979 | A1* | 10/2018 | Chessell | ................ G06Q 40/08 |
| 2019/0057362 | A1 | 2/2019 | Wright et al. | |
| 2019/0147431 | A1* | 5/2019 | Galebach | .................. H04L 9/50 705/44 |
| 2021/0014060 | A1* | 1/2021 | Georgiadis | .............. H04L 63/08 |
| 2022/0277307 | A1* | 9/2022 | Andrade | ................ G06Q 20/36 |

OTHER PUBLICATIONS

Narayanan et al., "Bitcoin and Cryptocurrency Technologies," Jul. 2016, See Ch. 3 "Mechanics of Bitcoin" (citing to Draft Feb. 2016, available from authors at https://bitcoinbook.cs.princeton.edu) (Year: 2016).

Uhr et al. WO 2017/104899 A1 (IP.com translation of KR 101661933) (priority to Dec. 16, 2015). (Year: 2017).

* cited by examiner

PUBLIC LEDGER AUTHENTICATION SYSTEM

CROSS REFERENCE TO RELATED APPLICATION

The present application is a continuation of U.S. patent application Ser. No. 15/195,030, filed Jun. 28, 2016, issuing as U.S. Pat. No. 10,937,069, entitled "Public Ledger Authentication System," which is a continuation-in-part of U.S. patent application Ser. No. 15/098,079, filed Apr. 13, 2016, now U.S. Pat. No. 10,438,197, entitled "Public Ledger Authentication System," the disclosures of which are incorporated herein by reference.

BACKGROUND

Field of the Disclosure

The present disclosure generally relates to online and/or mobile payments and more particularly to a public ledger authentication system that may be used to authenticate to an online and/or mobile payment system.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Online and/or mobile payment systems typically require authentication by their users in order to ensure that a user accessing a payment account and executing payment transactions using that payment account are authorized to do so. Conventional authentication systems typically require a user that is attempting to access a payment account and/or execute a payment transaction to provide authentication credentials in the form of a username and password, a biometric identifier (e.g., a thumb scan), and/or other conventional authentication credentials known in the art. However, many users utilize easily guessed authentication credentials that compromise the security of their payment account, or do not have biometric devices that allow for the higher security biometric identifier authentication discussed above.

Thus, there is a need for an improved authentication system.

Figure 1A:
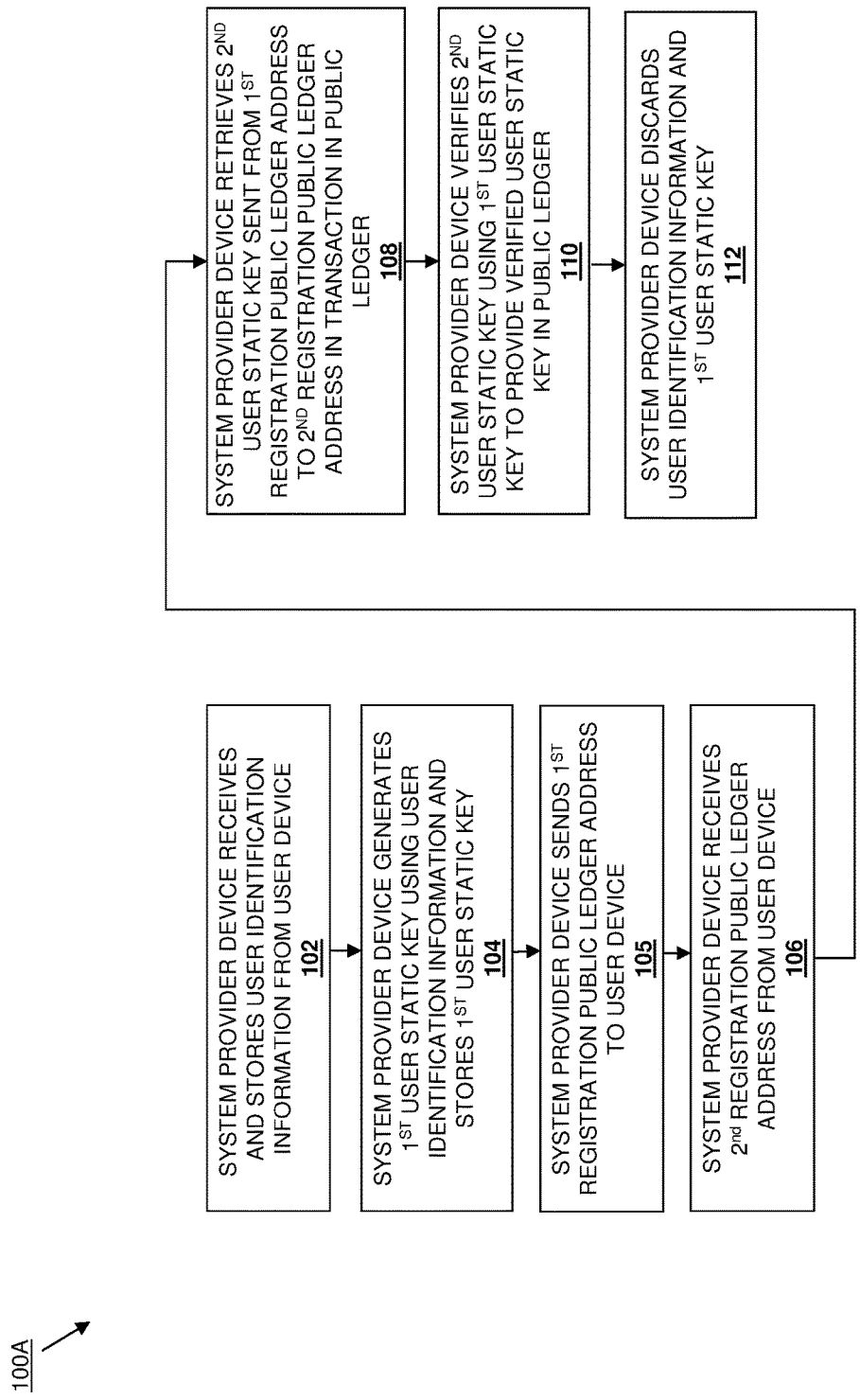
FIG. 1A is a flow chart illustrating an embodiment of a registration method for registering with a public ledger authentication system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Some embodiments of the present disclosure provide systems and methods for authentication via a public ledger to access, for example, a financial account, a website, and/or any other secure system known in the art. The public ledger may be dedicated for authentication (e.g., an "authentication public ledger), or may be provided as part of a crypto currency public ledger, to allow for the authentication of users to secure systems by a system provider. The public ledger authentication described herein includes an registration method in which each of a user and a system provider perform a common hash operation on user identification information (e.g., a user name, a user address, a user phone number, a user date of birth, a user social security number, etc.) to generate respective first and second static user keys. The system provider may identify a first registration public ledger address to the user, the user may identify a second registration public ledger address to the system provider, and the user may then subsequently send the first static user key to the first registration ledger address from the second registration public ledger address in a transaction in the public ledger. The system provider may then access that registration ledger address via the public ledger (using the identifications of the first and second registration ledger addresses to reference the public ledger) to retrieve the first static user key and register the user with the system if the first static user key matches the second static user key generated by the system provider. The first static user key in the public ledger then becomes a verified static user key in the public ledger that may be used for subsequent authentication of the user, and the system provider may erase or otherwise discard the user identification information and the second static user key.

Following registration, the user may authenticate to the secure system in an authentication method by sending the system provider a first previous authentication public ledger address that was used in a previous authentication attempt and a first current authentication public ledger address for use in the current authentication attempt. The system provider may use the first previous authentication public ledger address to access a database that identifies previous authentication public ledger addresses used by the user in previous authentication attempts and allows for the determination of a number of previous authentication attempts by the user, and identify the verified static user key in the public ledger. The system provider may then perform a hash operation using the number of previous authentication attempts and the verified static user key to generate a first user authentication key. The system provider then provides the user a second current authentication public ledger address for use in the current authentication attempt. The user may also perform the hash operation using the number of previous authentication attempts and the verified static user key (both of which may be stored by the user in a transaction wallet) to generate a second user authentication key, and send the second user authentication key from the first current authentication public ledger address to the second current authentication public ledger address in a transaction on the public ledger. The system provider may then check the transaction sent from the first current authentication public ledger address to the second current authentication public ledger address in the public ledger to retrieve the second user authentication key and authenticate the user with the system if the second user authentication key matches the first user authentication key generated by the system provider.

Referring now to FIGS. 1A, 1B, 2, and 3, a method 100 for providing public ledger authentication is illustrated. In the illustrated embodiment, the method 100 includes a registration sub-method 100A and an authentication sub-method 100B. In some embodiments of the method 100 described below, one or more system provider devices may operate to perform or enable the method 100. For example, a distributed group of devices may operate to maintain the public ledger discussed below by creating (a.k.a., "mining") a distributed crypto currency, processing transactions involving the distributed crypto currency, and/or otherwise performing actions that provide the public ledger utilized in the method 100 as detailed below. In a specific example, a payment service provider such as, for example, PayPal, Inc. of San Jose, Calif., may utilize a payment service provider device to perform the method 100 discussed below, and in some embodiments may operate in cooperation with one or more other system providers (via their system provider devices), payees (via their payee devices), payers (via their payer devices), and/or users (via their user devices) to perform the method 100 discussed below. However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Figure 2:
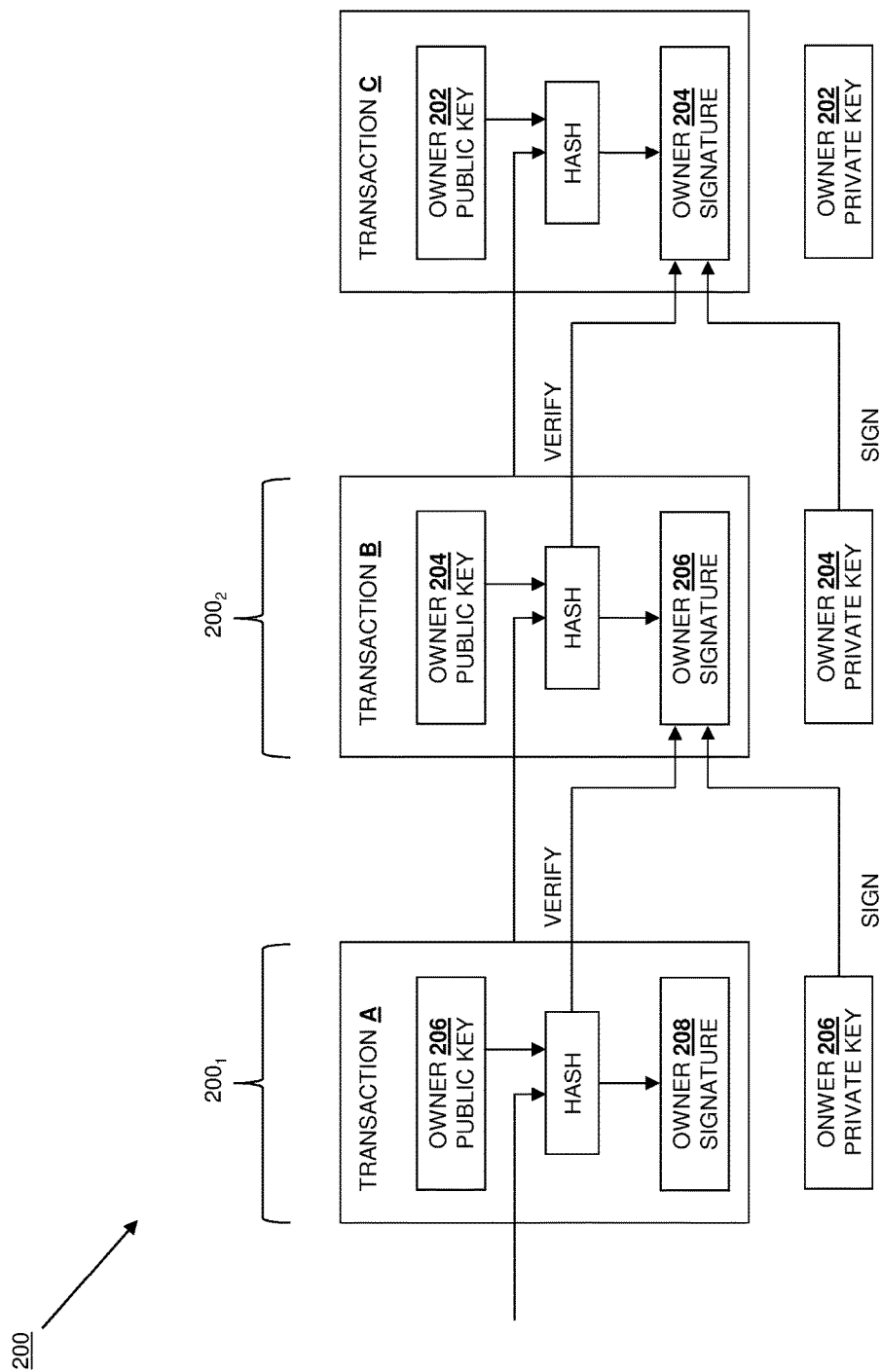
FIG. 2 is a schematic view illustrating an embodiment of an electronic coin or authentication token.

Referring now to FIG. 2, an embodiment of an electronic coin 200 is illustrated and described briefly for reference to the public ledger used in some embodiments of the method 100 discussed below. In those embodiments, a crypto currency system associated with the present disclosure defines an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of the previous owners 204, 206, and 208. Specifically, in transaction A, a hash of the public key of owner 206 (i.e., the owner receiving, as a result of transaction A, an electronic coin 2001 defined by digital signatures provided up to transaction A) and the previous transaction (not illustrated, but occurring prior to transaction A) was signed by owner 208 (i.e., the owner providing, as a result of transaction A, the electronic coin 2001 defined by digital signatures provided up to transaction A) and added to an initial electronic coin (which was defined by digital signatures provided up to the transaction prior to transaction A) such that the electronic coin 2001 was transferred to owner 206.

Similarly, in transaction B, a hash of the public key of owner 204 (i.e., the owner receiving, as a result of transaction B, an electronic coin 2002 defined by digital signatures provided up to transaction B) and transaction A was signed by owner 206 and added to the electronic coin 2001 such that the electronic coin 2002 was transferred to owner 204. Similarly, in transaction C, a hash of the public key of owner 202 (i.e., the owner receiving, as a result of transaction C, the electronic coin 200 defined by digital signatures provided up to transaction C) and the transaction B was signed by owner 204 and added to the electronic coin 2002 such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coins" is used to encompass any amount of electronic coins, and in the embodiments discussed below will typically be small fractions of a coin (e.g., 0.00000001 electronic coins) or some amount of a coin with relatively low value.

Figure 3:
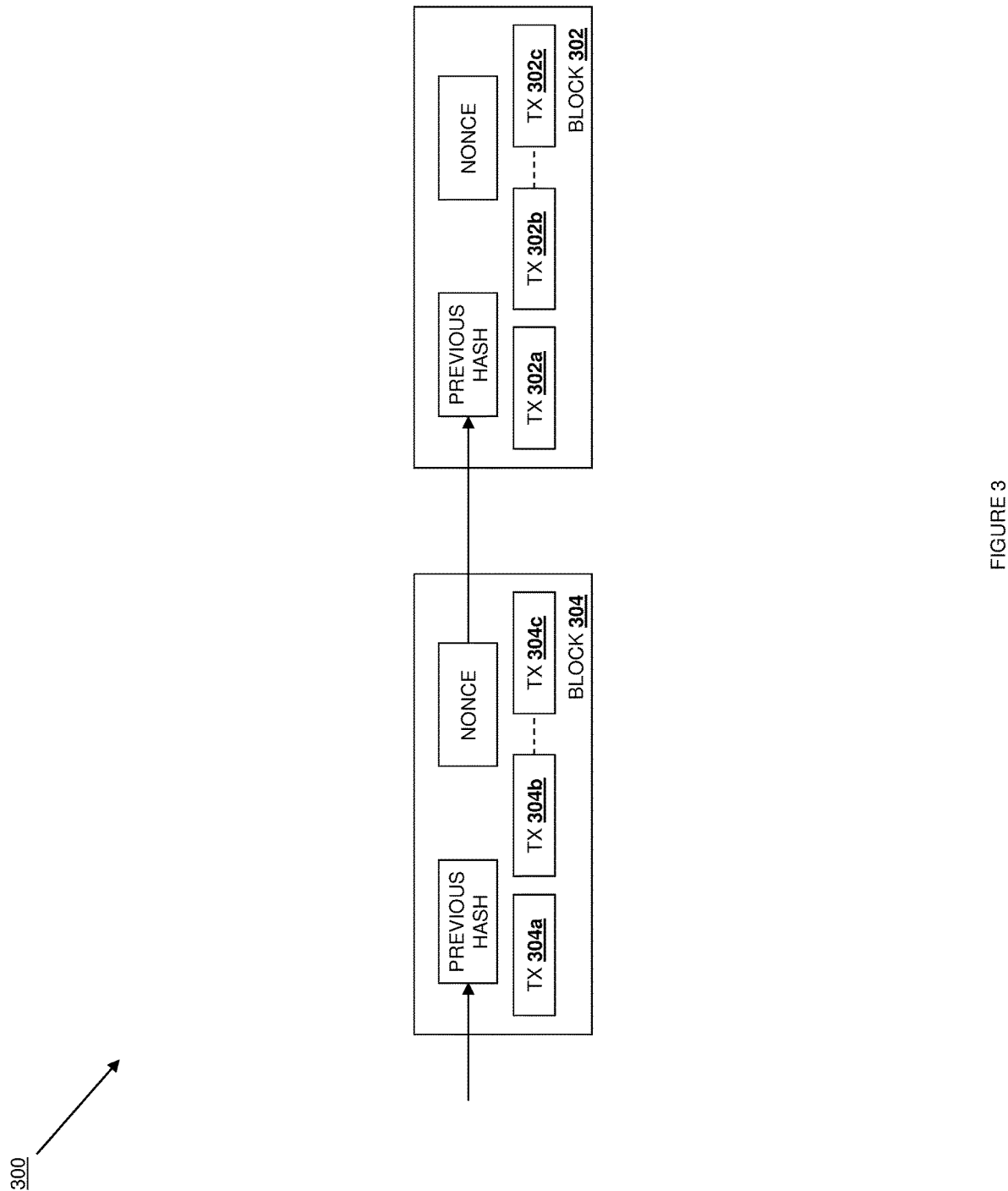
FIG. 3 is a schematic view illustrating an embodiment of a crypto currency public ledger or authentication public ledger.

Referring now to FIG. 3, an embodiment of a crypto currency public ledger 300 is illustrated and described briefly for reference to the public ledger used in some embodiments of the method 100 discussed below. Conventionally, the crypto currency public ledger 300 operates to verify that payers transferring an electronic coin (e.g., referring back to FIG. 2, owner 206 in transaction A, owner 204 in transaction B, and owner 202 in transaction C) did not "double-spend" (e.g., sign any previous transactions involving) that electronic coin. To produce the crypto currency public ledger 300, a distributed network of devices operates to agree on a single history of transactions in the order in which they were received such that it may be determined that a transaction between a payer and a payee using an electronic coin is the first transaction associated with that electronic coin. Each device in the distributed network operates collect new transactions into a block, and then to increment a proof-of work system that includes determining a value that when hashed with the block provides a required number of zero bits.

For example, for a block 302 that includes a plurality of transactions 302a, 302b, and up to 302c, a device in the distributed network may increment a nonce in the block 302 until a value is found that gives a hash of the block 302 the required number of zero bits. The device may then "chain" the block 302 to the previous block 304 (which may have been "chained" to a previous block, not illustrated, in the same manner) that includes a plurality of transactions 304a, 304b, and up to 304c. When devices in the distributed network find the proof-of-work for a block, that block (e.g., block 302) is broadcast to the distributed network, and other devices in the distributed network will accept that block if all the transactions in it are valid and not already spent (which may be determined by creating the next block using the hash of the accepted block 302). The distributed network will always consider the longest chain of blocks to be the correct one, and will operate to continue to extend it. If a device receives two different versions of a block, it will work on the first block received, but save the second block received in case the branch of the chain that includes the second block becomes longer (at which point that device will switch to working on the branch of the chain that includes the second block).

Conventionally, the electronic coin(s) 200 and crypto currency public ledger 300 discussed above provide a distributed crypto currency system in which payers and payees may participate in transactions with each other using the electronic coins discussed above and without the need for a centralized authority such as a bank. Each of those transactions is recorded in the crypto currency public ledger to ensure that the electronic coins may only be spent by a payer once. It has been discovered that the electronic coin(s) 200 and crypto currency public ledger 300 may be utilized in an authentication process that is detailed below. However, while discussed mainly in terms of the electronic coin(s) 200 and crypto currency public ledger 300 detailed above, other embodiments of the present disclosure envision authentication tokens (which are substantially similar to the electronic coin 200 discussed above) and an authentication public ledger (which is substantially similar to the crypto currency public ledger 300 discussed above) that need not be associated with crypto currencies or the electronic "coins" discussed above. As such, as discussed below, the electronic coin 200 may be replaced by a substantially similar authentication token that may be used to perform authentication transactions on the authentication public ledger that do not necessarily involve the transfer of value between users.

Figure 4:
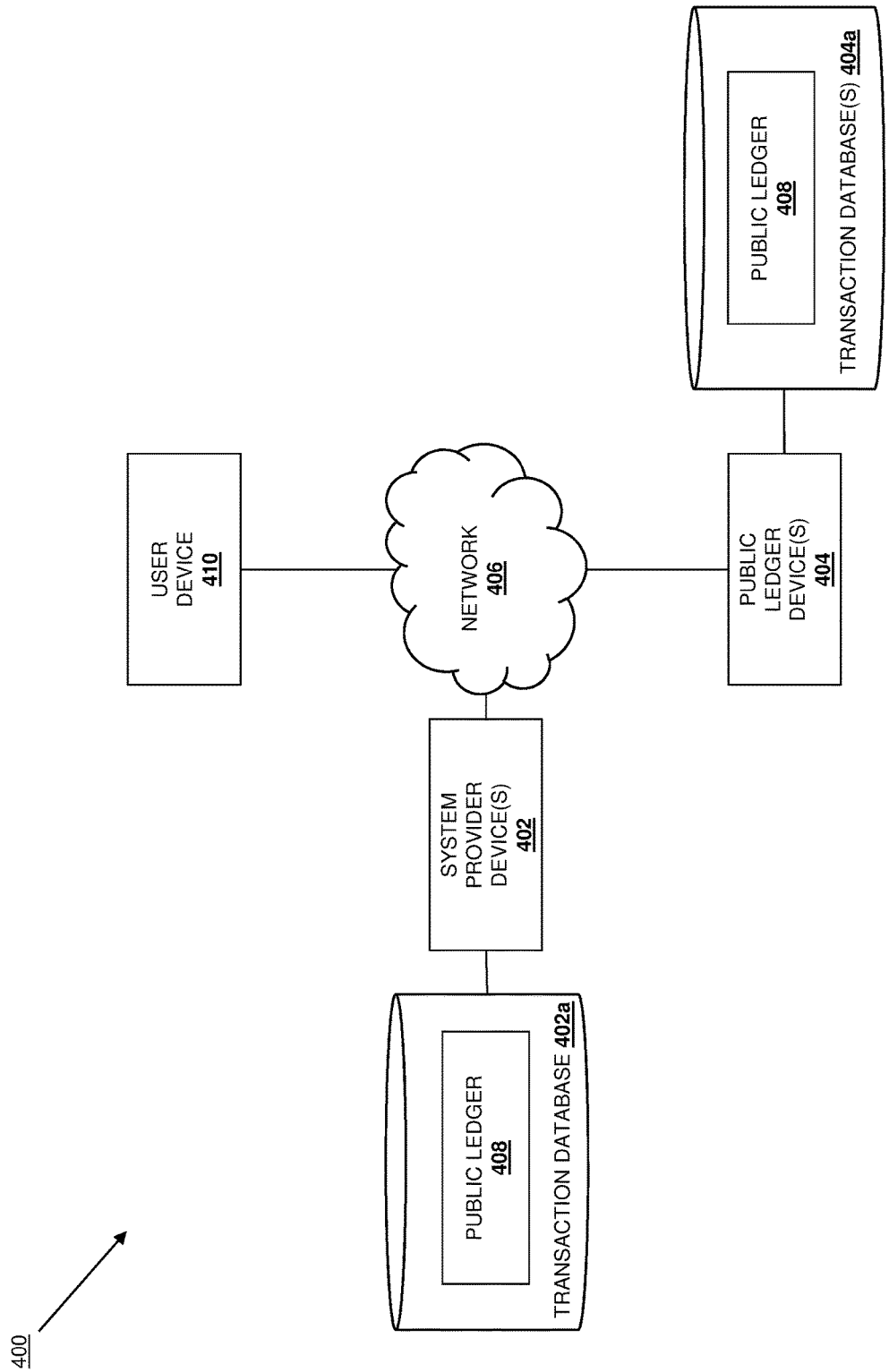
FIG. 4 is a schematic view illustrating an embodiment of a public ledger authentication system.

Referring now to FIG. 4, an embodiment of a public ledger authentication system 400 is illustrated and described briefly for reference in the method 100 discussed below. The public ledger authentication system 400 associated with the present disclosure may provide the public ledger discussed below as the crypto currency public ledger 300 discussed above in FIG. 3 that is part of a crypto currency system, as a dedicated authentication public ledger that need not necessarily be associated with a crypto currency system, or in other manners that would be apparent to one of skill in the art in possession of the present disclosure. For example, one or more system provider devices 402 and/or a public ledger devices 404 coupled together through a network 406 may operate to agree on a single history of transactions (e.g., crypto currency transactions, authentication transactions, etc.) in a public ledger 408 that may be stored on respective transaction databases 402a and 404a that are accessible by those system provider device(s) 402 and/or a public ledger device(s) 404 (e.g., each device may store its own copy of the public ledger). As discussed below, a user device 410 connected to the network 406 may then perform registration and authentication with the system provider device(s) 402.

In a specific example, for a block (e.g., similar to the blocks 302 and 304 discussed above with reference to FIG. 3) that includes a plurality of transaction (e.g., crypto currency transactions, authentication transactions, etc.), any of the system provider device(s) 402 and/or the public ledger device(s) 404 may increment a nonce in that block until a value is found that gives a hash of that block the required number of zero bits. The device may then "chain" that block to the previous block (which may have been "chained" to a previous block in the same manner). When the system provider device(s) 402 and/or the public ledger device(s) 404 find the proof-of-work for a block, that block may be broadcast to the distributed network (e.g., system provider device(s) 402 and/or the public ledger device(s) 404), and that block will be accepted if all the transactions in it are valid (which may be determined by creating the next block using the hash of the accepted block). The system provider device(s) 402 and/or the public ledger device(s) 404 will always consider the longest chain of blocks to be the correct one, and will operate to continue to extend it. If any of the system provider device(s) 402 and/or the public ledger device(s) 404 receives two different versions of a block, they will work on the first block received, but save the second block received in case the branch of the chain that includes the second block becomes longer (at which point that device with switch to working on the branch of the chain that includes the second block).

As such, in some embodiments, the registration transactions and authentication attempt transactions performed in the public ledger authentication system 400 as discussed herein may be recorded and published in the public ledger 408 as part of the crypto currency transactions performed in a distributed crypto currency system (e.g., a Bitcoin system), or in a substantially similar manner in a dedicated public ledger authentication system. As discussed above, in some examples of those embodiments, the creation and monitoring of the public ledger may be performed by a distributed network of computing systems operating to provide a crypto currency system or a dedicated public ledger authentication system. In other embodiments, the creation and monitoring of the public ledger 408 may be performed by a central authority such as the system provider discussed below. As such, the transactions recorded in the public ledger 408 may not be created and monitored like a distributed crypto currency, but rather may be recorded and tracked by the system provider device(s) 402 without necessarily including the public keys, signatures, and/or private keys utilized in tracking the transactions in a distributed crypto currency system. As such, a wide variety of variation in the manner in which transactions are reported, recorded, and published in the public ledger 408 of the public ledger authentication system 400 are envisioned as falling within the scope of the present disclosure.

Figure 5:
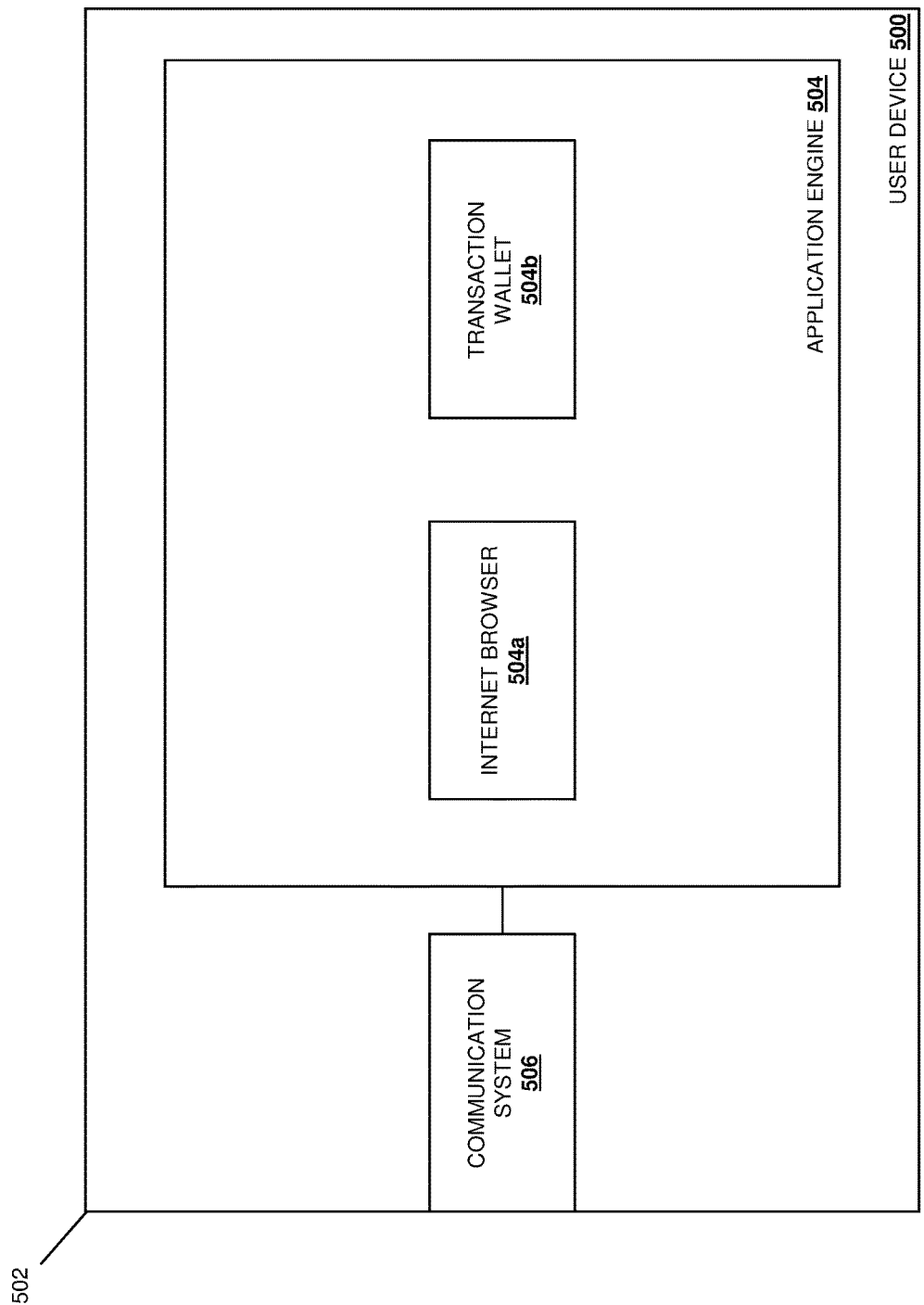
FIG. 5 is a schematic view illustrating an embodiment of a user device used in the public ledger authentication system of FIG. 4.

Referring now to FIG. 5, an embodiment of a user device 500 is illustrated that may be the user device 410 discussed above, and which may be provided by a desktop computing system, a laptop/notebook computing system, a tablet computing system, a mobile phone, and/or other user devices known in the art. In the illustrated embodiment, the user device 500 includes a chassis 502 that houses the components of the user device 500, only some of which are illustrated in FIG. 5. For example, the chassis 502 may house a processing system (not illustrated) and a non-transitory memory system (not illustrated) that includes instructions that, when executed by the processing system, cause the processing system to provide an application engine 504 for is configured to perform the functions of the applications and user devices discussed below. In a specific example, the application engine 504 is configured to provide an internet browser application 504a and the transaction wallet application 504b discussed below, although one of skill in the art in possession of the present disclosure will recognize that other applications and computing device functionality may be enabled by the application engine 504 as well. The chassis 502 may also house a communication system 506 that is coupled to the application engine 504 (e.g., via a coupling between the communication system 506 and the processing system) and configured to provide for communication through the network 406 as detailed below.

In some embodiments, the system provider device(s) 402 may provide the transaction wallet application 504*b* through the network to the user device 500 prior to or during the method 100 (e.g., in order to perform the registration sub-method 100A). However, in other embodiments, the transaction wallet application 504*b* may be provided on the user device 500 by the user separately from the method 100. For example, the transaction wallet application 504*b* may be utilized with a crypto currency system as discussed above to perform crypto currency transactions. As such, the transaction wallet application 504*b* may be a dedicated authentication transaction wallet application, a crypto currency transaction wallet application that has be "repurposed" for use in public ledger authentication, or other public ledger wallets known in the art.

Referring now to FIG. 1A, the registration sub-method 100A begins at block 102 where a system provider device receives and stores user identification information from a user device. In some embodiments, the registration sub-method 100A may be performed by a user of the user device 410 upon initial registration with the system provided by the system provider device(s) 402 (or utilizing the public ledger authentication system provided by the system provider device(s) 402). However, in other embodiments, the registration sub-method 100A may be performed by a user of the user device 410 that has previously registered with the system provided by the system provider devices 402 (or utilizing the public ledger authentication system provided by the system provider device(s) 402) in order to subsequently authenticate with that system. At block 102, the user device 410 may provide the system provider device(s) 402 a variety of user identification information such as, for example, a name of the user, an address of the user, a phone number of the user, a date of birth of the user, a social security number of the user, and/or any other identifier that may be utilized to identify the user. For example, the user identification information may be received via a secure data transfer using a user identification information web page provided by the system provider device(s) 402 through the network 406 to the user device 410. However, in another example, the user identification information may have been previously collected from the user device 410 or via other means by the system provider device(s) 402. At block 102, the system provider device(s) 402 may store that user identification information in one or more databases that are accessible to the system provider device(s) 402.

The method 100A may then proceed to block 104 where the system provider device generates a first user static key using the user identification information, and stores the first user static key. In an embodiment, at block 104 the system provider device(s) 402 may use a hash function to perform a hash operation on the user identification information received from the user and stored at block 102 in order to generate a first user static key, and store that first user static key in one or more databases that are accessible to the system provider device(s) 402. As discussed below, the hash operation may be performed by the system provider device(s) 402 using the hash function that is shared with the user device 410 so that the user may generate a second static user key using their user identification information that is identical to the first user static key if that user is an authorized user that both 1) knows the user identification information, and 2) has received the correct hash function from the system provider. For example, the system provider device(s) 402 may provide or identify the hash function to the user device 410/500 through the network 406, and the user device 410/500 may store that hash function (or the identity/location of that hash function) in the transaction wallet application 504*b*.

The registration sub-method 100A then proceeds to block 105 where the system provider device sends a first registration public ledger address to the user device. In an embodiment, at block 105 the system provider device(s) 402 may send a first registration public ledger address through the network 406 to the user device 410. For example, at block 105, the system provider device(s) 402 may identify a "to" address in the public ledger 408 (i.e., an address in the public ledger 300 that is controlled by the system provider device(s) 402) as a first registration public ledger address, and send that first registration public ledger address through the network 406 to the user device 410. In an embodiment, the transmission of the first registration public ledger address may be performed via a secure data transfer. For example, the transmission of the first registration public ledger address may be performed by the system provider device(s) 402 over a secure data channel, the system provider device(s) 402 may encrypt the first registration public ledger address before its transmission, and/or a variety of other secure data transfer methods may be performed at block 105 to ensure that the first registration public ledger address cannot be intercepted in a manner that discloses that first registration public ledger address to entities other than the user.

The registration sub-method 100A then proceeds to block 106 where the system provider device receives a second registration public ledger address from the user device. In an embodiment, at block 106 the user device 410 may send a second registration public ledger address through the network 406 to the system provider device(s) 402. For example, at block 106, the transaction wallet application 504*b* in the user device 410/500 may identify a "from" address in the public ledger 408 (i.e., an address in the public ledger 300 that is associated with electronic coin(s) 200 and/or authentication tokens that are controlled by the transaction wallet application 504*b*) as a second registration public ledger address, and send that second registration public ledger address through the network 406 to the system provider device(s) 402. In an embodiment, the transmission of the second registration public ledger address may be performed via a secure data transfer. For example, the transmission of the second registration public ledger address may be performed by the transaction wallet application 504*b* over a secure data channel, the transaction wallet application 504*b* may encrypt the second registration public ledger address before its transmission, and/or a variety of other secure data transfer methods may be performed at block 106 to ensure that the second registration public ledger address cannot be intercepted in a manner that discloses that second registration public ledger address to entities other than the system provider.

The registration sub-method 100A then proceeds to block 108 where the system provider device retrieves a second user static key sent to the first registration public ledger address from the second registration public ledger address in a transaction in the public ledger. In an embodiment, following block 106, the user device 410 may generate the second static user key using the hash function (received or identified by the system provider device(s) 402) and the user identification information discussed above. The user device 410 may then send that second static user key to the first registration public ledger address from the second registration public ledger address in a transaction in the public ledger 408. For example, the transaction wallet application 504*b* in the user device 410/500 may generate the second user static key as discussed above and include it in a metadata field of a transaction in the public ledger 408 that is sent to the first registration public ledger address from the second registration public ledger address. In some embodiments, the transaction at block 108 may be a crypto currency transaction that sends an amount of crypto currency (e.g., 1 satoshi in a Bitcoin transaction that is worth fractions of cent) to the first registration public ledger address from the second registration public ledger address, and that includes the second static user key in metadata provided with the transaction. In other embodiments, the transaction at block 108 may send an authentication token to the first registration public ledger address from the second registration public ledger address, and that includes the second static user key in metadata provided with the transaction.

At block 108, the system provider device(s) 402 may retrieve the second user static key sent to the first registration public ledger address from the second registration public address in the transaction in the public ledger 408 by accessing the public ledger 408 and using the first and second registration public ledger addresses to identify the transaction that includes the second static user key in its metadata, and then retrieving the second static user key from that transaction. In the event that no static user key is included in the transaction sent to the first registration public ledger address from the second registration public ledger address, the registration sub-method 100A may end and the user may not be registered with the system. As such, the secure data transfer of the first and second registration public ledger addresses between the user device 410 and the system provider device(s) 402 ensures the system provider device(s) 402 that a subsequent static user key retrieved in a transaction to the first registration public ledger address and from the second registration public ledger address was provided by the user.

The registration sub-method 100A then proceeds to block 110 where the system provider device verifies the second static user key using the first static user key to provide a verified static user key in the public ledger. In an embodiment, the system provider device(s) 402 may compare the second static user key that was retrieved from the public ledger 408 at block 108 with the first static user key that was generated by the system provider device(s) 402 and stored at block 104 to determine whether they match. In the event the second static user key retrieved from the public ledger 408 at block 108 does not match the first static user key generated and stored at block 104, the registration sub-method 100A may end and the user may not be registered with the system. However, if the second static user key retrieved from the public ledger 408 at block 108 matches the first static user key generated and stored at block 104, the second static user key that is included in the transaction in the public ledger 408 becomes a verified static user key, and the user is now "registered" with the system and the user may subsequently authenticate using the system as described in detail with reference to the authentication sub-method 100B discussed below.

The registration sub-method 100A then proceeds to block 112 where the system provider device(s) 402 discard the user identification information and the first user static key. In an embodiment, at block 112 the system provider device(s) 402 may erase, overwrite, or otherwise discard the user identification information and the first static user key that were stored in the at least one database at blocks 102 and 104. As will be appreciated by one of skill in the art in possession of the present disclosure, following verification of the second static user key in the public ledger 408 to provide the verified static user key, the storage of the user identification information received at block 102 or the first static user key generated at block 104 is unnecessary as the system provider may perform the actions discussed below with regard to the authentication sub-method 100B to authenticate the user simply using the verified static user key included in the transaction in the public ledger 408. Thus, user identification information such as Personally Identifiable Information (PII) does not need to be stored by the system provider device(s) 402, and may only reside with the user (e.g., memorized by the user, stored in the transaction wallet application 504*b*, etc.)

Figure 1B:
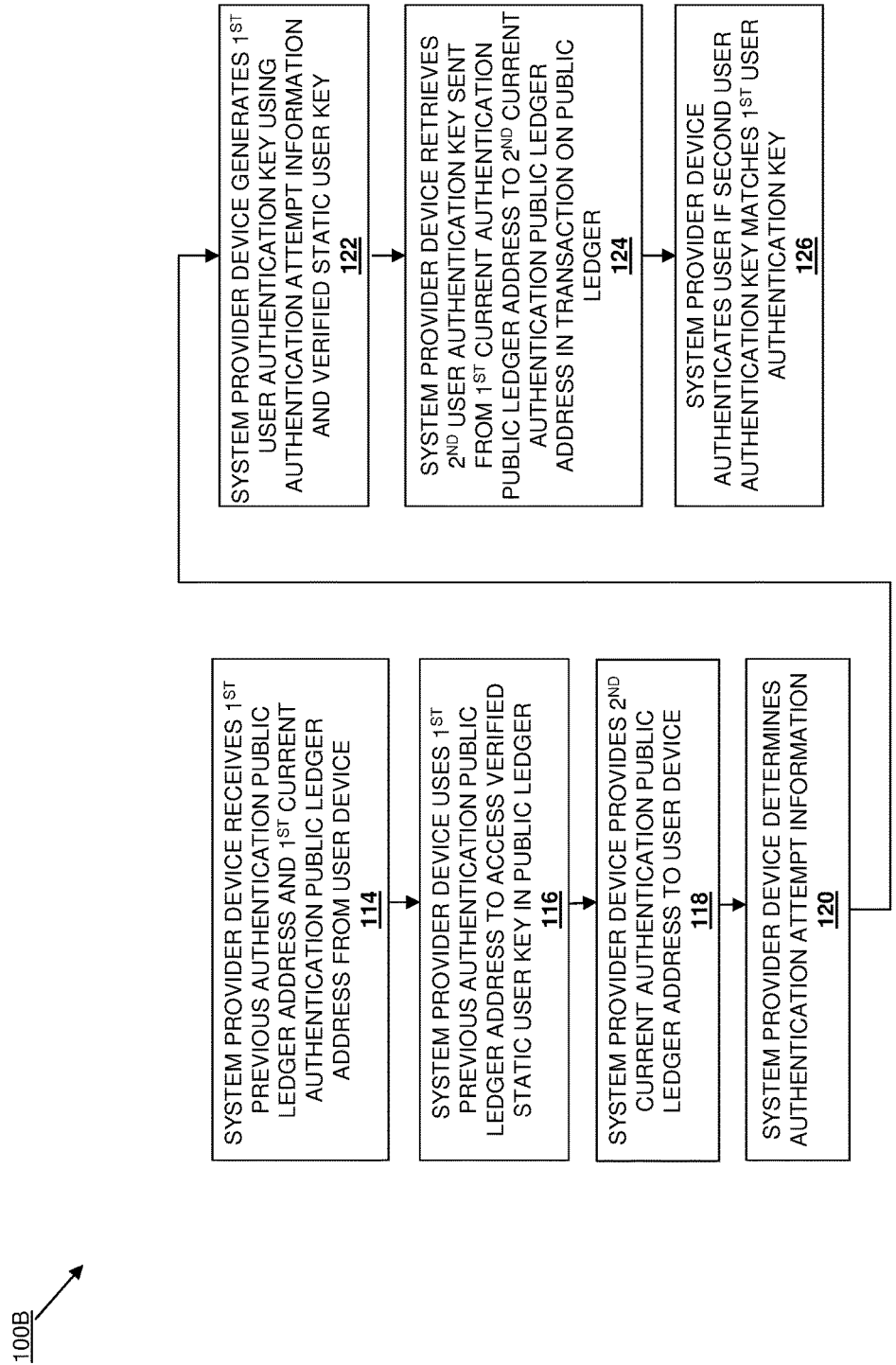
FIG. 1B is a flow chart illustrating an embodiment of a authentication method for authenticating using a public ledger.
Figure 6:
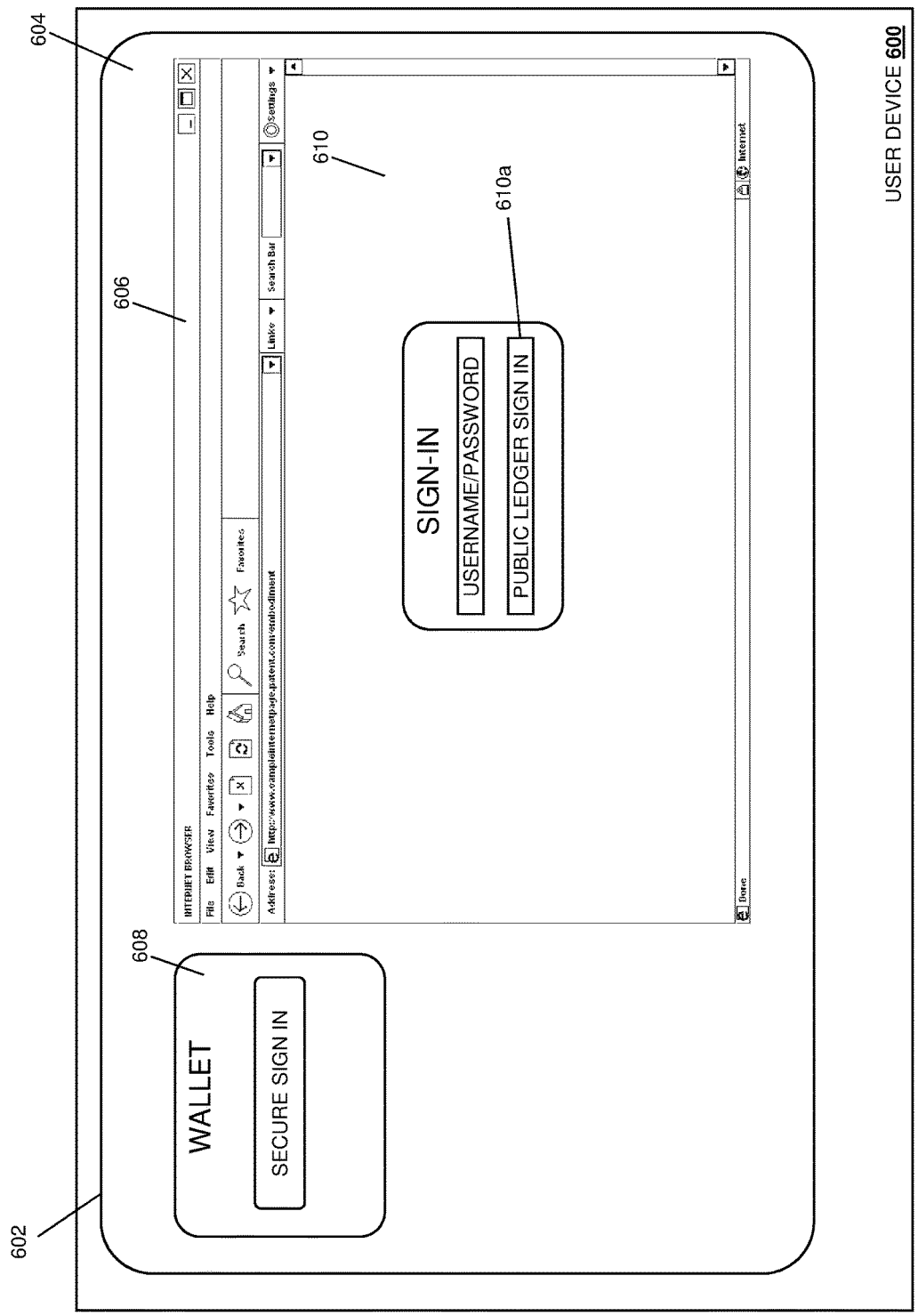
FIG. 6 is a screen shot of an embodiment of a user device displaying an authentication screen.

Referring now to FIGS. 1B and 6, the method 100 may then proceed to the authentication sub-method 100B. FIG. 6 illustrates a user device 600, which may be the user devices 410 and/or 500 discussed above, including a display device 602 displaying an embodiment of an authentication screen 604. In the illustrated embodiment, the authentication screen 604 includes an Internet browser 606 (e.g., provided by the Internet browser application 504*a* discussed above with reference to FIG. 5) and a transaction wallet 608 (e.g., provided by the transaction wallet application 504*b* discussed above with reference to FIG. 5.) For example, the user may access an authentication web page 610 that is provided on the Internet browser 606 and that includes a public ledger sign-in option 610*a* that the user has previously registered for. In response to the user selecting the public ledger sign-in option 610*a*, the transaction wallet 608 may automatically launch such that it is provided on the authentication screen 604 adjacent the Internet browser 606. However, in other embodiments, the actions performed according to the authentication sub-method 100B discussed below may be performed without activation or launching of the Internet browser 606 and/or the transaction wallet 608. For example, in response to loading the authentication page 610 on the Internet browser, the transaction wallet 608 may operate in the background (e.g., without launching) to perform the actions discussed with reference to the authentication sub-method 100B below. In another example, authentication may occur for a system that is not displayed in an Internet browser, and thus may occur entirely in the background (e.g., without launching the Internet browser 606 or the transaction wallet 608) to perform the actions discussed with reference to the authentication sub-method 100B below. As such, a wide variety of authentication scenarios other than those illustrated will benefit from the teachings of the present disclosure and thus are envisioned as falling within its scope.

The authentication sub-method 100B begins at block 114 where the system provider device receives a first previous authentication public ledger address and a first current authentication public ledger address from the user device. In an embodiment, at block 114 the transaction wallet application 504*b* in the user device 410/500 may retrieve a first previous authentication public ledger address that may be the "from" address that was used in a previous authentication attempt with the public ledger authentication system 400. For example, the first previous authentication public ledger address may be the "from" address utilized by the user to perform the most recent authentication with the public ledger authentication system 400 (e.g., the most recent performance of the authentication sub-method 100B prior to the current performance of the authentication sub-method 100B). In an embodiment, at block 114, the transaction wallet application 504b in the user device 410/500 may also identify a "from" address in the public ledger 408 (i.e., an address in the public ledger 300 that is associated with electronic coin(s) 200 and/or authentication tokens that are controlled by the transaction wallet application 504b) as a first current public ledger address that will be used in the authentication attempt discussed in further detail below according to the authentication sub-method 100B.

At block 114, the user device 410/500 may send the first previous authentication public ledger address and the first current authentication public ledger address through the network 406 to the system provider device(s) 402. In an embodiment, the transmission of the first previous authentication public ledger address and the first current authentication public ledger address may be performed via a secure data transfer. For example, the transmission of first previous authentication public ledger address and the first current authentication public ledger address may be performed by the transaction wallet application 504b over a secure data channel, the transaction wallet application 504b may encrypt the first previous authentication public ledger address and the first current authentication public ledger address before transmission, and/or a variety of other secure data transfer methods may be performed at block 114 to ensure that the first previous authentication public ledger address and the first current authentication public ledger address cannot be intercepted in a manner that discloses first previous authentication public ledger address and the first current authentication public ledger address to entities other than the system provider.

The authentication sub-method 100B then proceeds to block 116 where the system provider device uses the first previous authentication public ledger address to access the verified static user key in the public ledger. In an embodiment, the system provider device(s) 402 may utilize the first previous authentication public ledger address to identify at least one other previous authentication public ledger address, and use that other previous authentication public ledger address to identify the verified static user key in the public ledger 408. For example, the system provider device(s) 402 may include a database that associates each user (including the user of the user device 408) with all of the "from" public ledger addresses that have been utilized by that user in previous authentication attempts with the public ledger authentication system 400. As such, at block 116, the system provider device(s) 402 may access that database and use the first previous authentication public ledger address to determine the user that previously used that first previous authentication public ledger address in a previous authentication attempt, and then reference the other previous authentication attempt public ledger addresses (including the registration public ledger address) to access the transaction in the public ledger that was performed during the registration method 100A and that includes the verified static user key.

Furthermore, the system provider device(s) 402 may store all the previous "to" addresses used in previous authentication transaction by the user. For example, each previous "to" address may be associated in a database with its corresponding "from" address for each of the previous authentication transactions performed to authenticate the user, and at block 116 the system provider device(s) 402 may use the "to" and "from" address pairs to access the verified static user key in the public ledger. As such, the system provider device(s) may provide the user device with a different "to" address for each authentication transaction so that each authentication transaction is associated with different "to" and "from" address pairs.

The authentication sub-method 100B then proceeds to block 118 where the system provider device provides a second current authentication public ledger address to the user device. In an embodiment, at block 118, the system provider device(s) 402 may identify a "to" address in the public ledger 408 (i.e., an address in the public ledger 300 that is associated with electronic coin(s) 200 and/or authentication tokens that are controlled by the system provider device(s) 402) as a second current public ledger address that will be used in the authentication attempt discussed in further detail below, and send that second current authentication public ledger address through the network 406 to the user device 410. In an embodiment, the transmission of the second current authentication public ledger address may be performed via a secure data transfer. For example, the transmission of the second current authentication public ledger address may be performed by the system provider device(s) 402 over a secure data channel, the system provider device(s) 402 may encrypt the second current public ledger address before transmission, and/or a variety of other secure data transfer methods may be performed at block 118 to ensure that the second current authentication public ledger address cannot be intercepted in a manner that discloses second current authentication public ledger address to entities other than the user.

The authentication sub-method 100B then proceeds to block 120 where the system provider device determines authentication attempt information. In an embodiment, at block 120 the system provider device(s) 402 determines authentication attempt information that may include, for example, a number of previous authentication attempts by the user. For example, using the first previous authentication public ledger address and the database of other previous authentication public ledger addresses used by the user in previous authentication attempts, the system provider device(s) may determine a count the number of previous authentication attempts by the user. In addition, in some embodiments the authentication attempt information may include a date and time for the current authentication attempt. For example, the system provider device(s) 402 and the transaction wallet application 504b in the user device 500 may synchronize a date and time between each other, and at block 120 the system provider device(s) may identify a date and time for the current authentication attempt by the user.

The authentication sub-method 100B then proceeds to block 122 where the system provider device generates a first user authentication key using the authentication attempt information and the verified static user key. In an embodiment, at block 122 the system provider device(s) 402 may use a hash function to generate a first user authentication key by performing a hash operation on the authentication attempt information. For example, the system provider device(s) 402 may utilize a hash function (which may be shared with the user device 410 similarly as discussed above for the hash function used in the registration method 100A) with the verified static user key that was accessed at block 116, along with the number of previously authentication attempts by the user, to generate the first user authentication key. In some specific examples, the hash operation may be performed on the verified static user key, the number of previous authentication attempts by the user, the date and time for the current authentication attempt, and/or other information available to the system provider device(s).

The authentication sub-method 100B then proceeds to block 124 where the system provider device retrieves a second user authentication key sent from the first current authentication public ledger address to the second current authentication public ledger address in a transaction in the public ledger. In an embodiment, at block 124 the user device may generate a second user authentication key using the same hash function that was utilized by the system provider device at block 122 to generate the first user authentication key, and send that second user authentication key from the first current authentication public ledger address (provided to the system provider device(s) 402 at block 114) to the second current authentication public ledger address (received from the system provider device(s) 402 at block 118) in a transaction on the public ledger 408. As such, at block 124 the transaction wallet application 504b in the user device 410/500 may perform the same hash operation as was performed by the system provider device at block 122 on the verified static user key (which may be stored in the transaction wallet application 504b or accessible by the user device 410 on the public ledger 408), the number of previous access attempts by the user (which may be stored in or accessible by the transaction wallet application 504b), and in some examples the date and time of the current authentication attempt (which is synchronized with the system provider device(s)) to generate the second user authentication key. As such, in some embodiments, the user device 410 may only need to store the "from" address used in the most recent authentication attempt along with a count of the number of authentication attempts to the public ledger authentication system 400 in order to authenticate to a secure system.

The transaction wallet application 504b may then provide the second user authentication key as metadata in a transaction that is sent from the first current authentication public ledger address to the second current authentication public ledger address in a transaction on the public ledger 408. As such, at block 124, the system provider device(s) 402 may access that transaction on the public ledger 408 (i.e., by referencing the first current authentication public ledger address and/or the second current authentication public ledger address, both of which are known to the system provider device(s) 402) and retrieve the second user authentication key.

The authentication sub-method 100B then proceeds to block 126 where the system provider device authenticates the user if the second user authentication key matches the first user authentication key. In an embodiment, if the system provider device(s) 402 determine that the second user authentication key retrieved at block 124 matches the first user authentication key generated at block 122, the system provider device(s) 402 may authenticate the user and allow the user to access the secure system protected by the public ledger authentication system 400. However, if the system provider device(s) 402 determine that the second user authentication key retrieved at block 124 does not match the first user authentication key generated at block 122, the system provider device(s) does not authenticate the user and the user is not allowed to access to the secure system protected by the public ledger authentication system 400.

Thus, systems and methods have been described that provide for the authentication of a user to the system via a public ledger. The public ledger authentication systems and methods provide for registration and authentication of users using a public ledger in a manner that eliminates the need for the system provider to store user identification information about the user, while only requiring the user to store a previous "from" address used in an authentication attempt, along with the number of authentication attempts that have been made to the system. As such, the public ledger authentication system provides a secure authentication system where the protection of the number of authentication attempts and the addresses used in those authentication attempts prevents unauthorized authentication to the system.

A wide variety of systems may be built on top of the authentication systems and methods discussed above to leverage the ability to verify and authenticate users via a public ledger as discussed above. For example, as discussed below, modifications to the authentication sub-method 100A discussed above allow for the linking of a "real" identity of a user (e.g., a name, address, phone number, social security number, financial account number, payment account information, and/or other user identity information) with a verified user static key in a public ledger. That linking of the "real" identity to the verified user static key may be leveraged to provide anonymous payments in which a payer can transfer funds to a payee, while the payee may be ensured that the payer has been verified according to a variety of compliance regulations (e.g., Know Your Customer (KYC) regulations, Anti-Money Laundering (AML) regulations, etc.) and thus that the funds from the payer are safe and/or legal to accept. While in the embodiments discussed below, the systems and methods are described as providing for anonymous donations from a donor user to a donee user, one of skill in the art in possession of the present disclosure will recognize that the teachings herein may be applied to variety of anonymous payments or fund transfers while remaining within the scope of the present disclosure.

Figure 7:
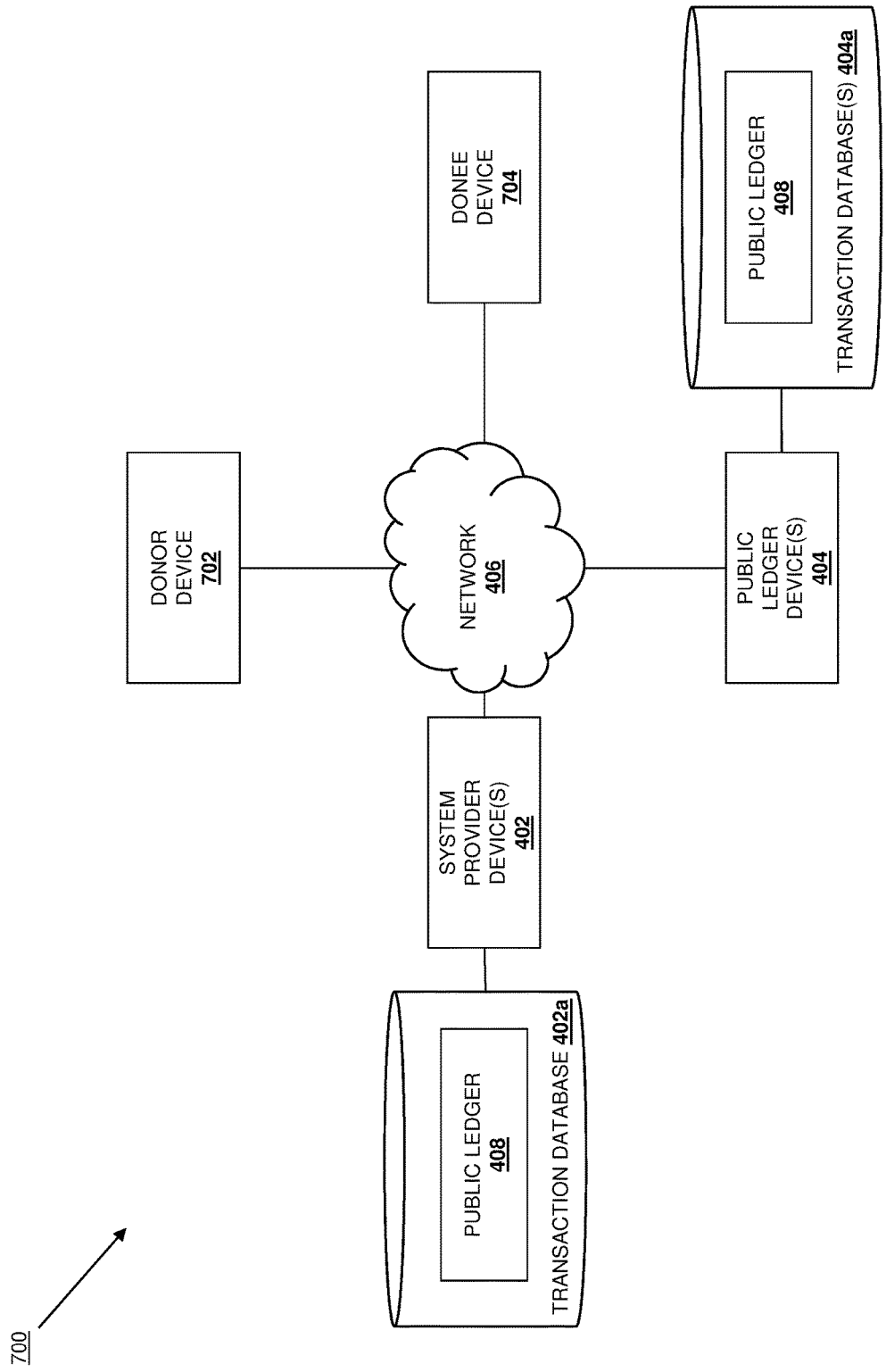
FIG. 7 is a flow chart illustrating an embodiment of a anonymous donation method.

Referring now to FIG. 7, an embodiment of an anonymous payment system 700 is illustrated and described briefly for reference in the anonymous donation/payment method 800 discussed below. The anonymous payment system 700 includes similar components to the public ledger authentication system 400 described above with reference to FIG. 4, and thus those similar components are provided with similar reference numbers. As such, the anonymous payment system 700 may provide the public ledger discussed herein that is part of a virtual or crypto-currency system, as a dedicated authentication public ledger that need not necessarily be associated with a virtual or crypto-currency system, or in other manners that would be apparent to one of skill in the art in possession of the present disclosure. Similarly as discussed above, the one or more system provider devices 402 and/or public ledger device(s) 404 coupled together through the network 406 may operate to agree on a single history of transactions (e.g., crypto-currency transactions, authentication transactions, etc.) in the public ledger 408 that may be stored on the respective transaction databases 402a and 404a that are accessible by those system provider device(s) 402 and/or public ledger device(s) 404 (e.g., each device may store its own copy of the public ledger). As discussed below, a payer device (illustrated as the donor device 702 in FIG. 7) and a payee device (illustrated as the donee device 704 in FIG. 7) are connected to the network 406 and may perform registration and authentication with the system provider device(s) 402 as discussed above, as well as the anonymous payment/donation functionality discussed below.

With reference back to FIG. 1A and the registration sub-method 100A, in some embodiments, blocks 102, 104, 105, 106, 108, and 110 of the registration sub-method 100A may be performed while block 112 may be modified. For example, rather than discard the user identification information as discussed above for original block 112, the system provider device(s) 402 may perform a modified block 112 and operate to store the user identification information received at block 102 in a database (e.g., similar to the transaction database 402a) in association with the verified user static key that was provided in the public ledger at block 110. As such, user identity information of users including user names, user addresses, user phone numbers, user social security numbers, user financial account numbers, user payment account information (e.g., payment account access information), and/or other user identity information known in the art, may be associated in a database that is accessible by the system provider device(s) 402 with the verified user static keys that were created for those users during the registration sub-method 100A and stored in the public ledger.

In some embodiments of the modified block 112 discussed above, the system provider device(s) 402 may operate to perform a regulation verification process such as a KYC process to verify the identity of the user (e.g., using the user identification information). As is known in the art, KYC processes may be performed to ensure that money handling systems are not used by criminal elements for money laundering activities, and may include any or all of: collection and analysis of the user identification information (referred to in the United States regulations and practice as a "Customer Identification Program" or CIP); user name matching against lists of known parties (such as "politically exposed person" or PEP); determination of the customer's risk in terms of propensity to commit money laundering, terrorist finance, or identity theft; creation of an expectation of a customer's transactional behavior (e.g., using access to user payment or financial accounts provided via the user identification information); and monitoring of a customer's transactions against expected behavior and recorded profile as well as that of the customer's peers (e.g., using access to user payment or financial accounts provided via the user identification information). Furthermore, in some embodiments, the system provider may not perform the regulation verification process, but rather may communicate with a third party that has done so in order to regulation verify a user. For example, some donor users may be verified or pre-verified (e.g., prior to requesting a donation to a donee) by a third party system and the system provider may confirm that regulation verification rather with that third party system rather than perform the regulation verification process.

Thus, following modified block 112 of the registration sub-method 100A, the system provider device(s) 402 may include a verified user database that includes "verified" users (e.g., user's that have been verified using their user identification information according to KYC or similar regulations) associated with respective verified user static keys that are stored in the public ledger. In some embodiments, block 112 may be modified in a variety of manners other than those discussed above. For example, the user identification information for any user may be stored in association with the verified user static key for that user, and then subject to the verification process when a payment or donation is requested by that user. In another example, the user identification information for any user may be used to perform the verification process for that user as discussed above, and following the verification process, that user identification information may be discarded while the results of that verification process may be stored in association with the verified user static key. As such, a verified user static key may be associated with a regulation verified user indication (i.e., a KYC compliant user indication) while the user identification information used to determine that the user is regulation verified has been discarded, and a verified user static key may be associated with a regulation non-verified user indication (i.e., a non-KYC compliant user indication) while the user identification information used to determine that the user is not regulation verified has been discarded.

Figure 8:
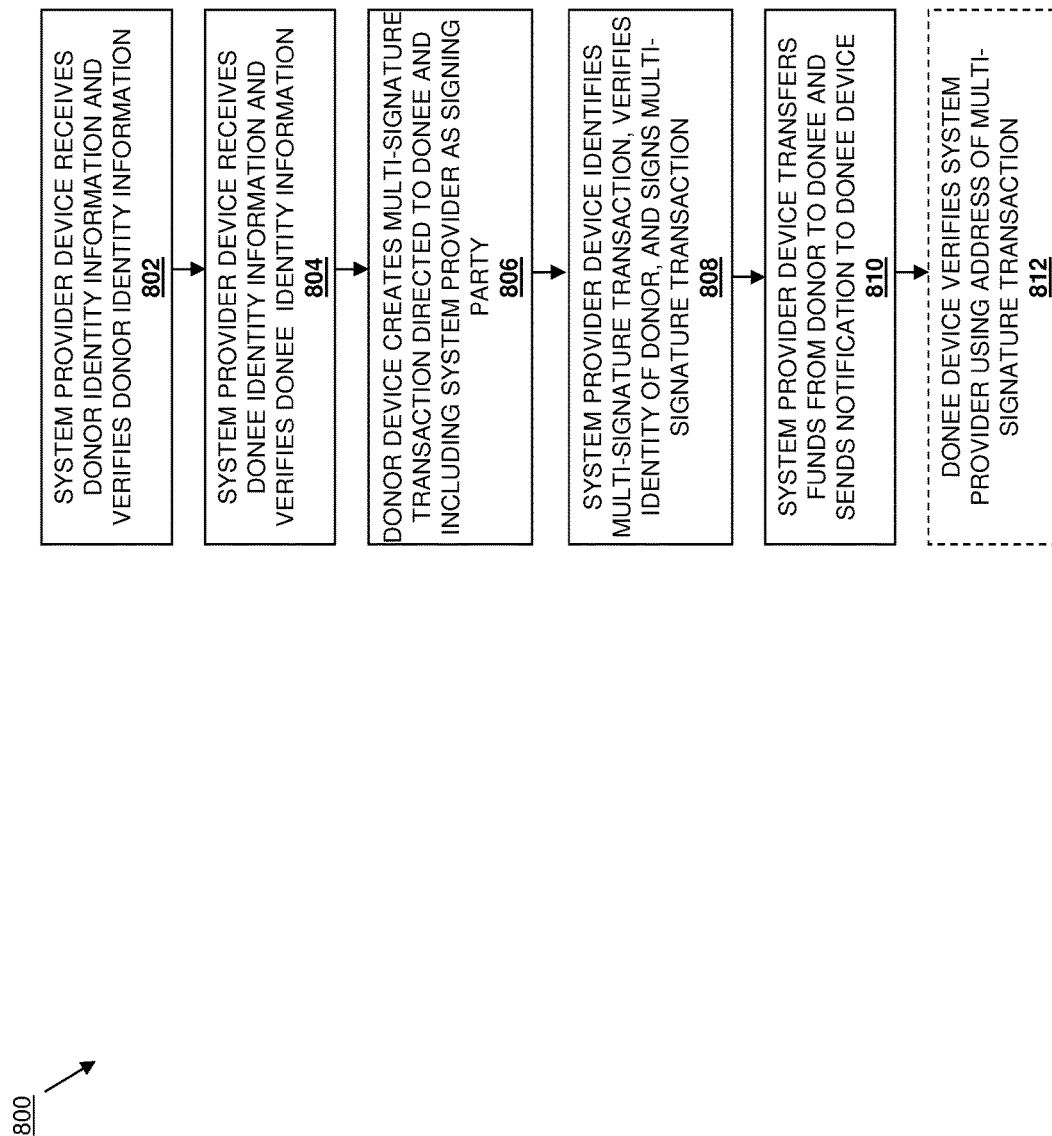
FIG. 8 is a schematic view illustrating an embodiment of an anonymous donation system.

Referring now to FIG. 8, an embodiment of an anonymous payment/donation method 800 is illustrated. Making payments such as, for example, the donations discussed below, can subject the payer/donor to subsequent communications (e.g., "spam" communications) from any parties that receive and/or intercept their user identity information along with that payment/donation. In addition, some payers/donors may not want to publicize their generosity. To avoid such communication and/or publicity, many prospective donors may avoid making donations. One solution to this problem is for donors to make such donations anonymously. However, anonymous donations raise a number of issues. For example, many businesses, companies, and/or entities may be hesitant to accept payments and/or donations from an anonymous payer/donor, as regulatory compliance rules require that the identity of such payers/donors be known to ensure that those payments/donations are not being made by criminal elements for money laundering activities. The anonymous payment/donation method 800 discussed below utilizes a modified form of the registration sub-method 100A and authentication sub-method 100B discussed above to provide for anonymous payments/donations from a payer/donor to a payee/donee, while providing assurances to the payee/donee that the payer/donor satisfies any applicable regulatory compliance rules.

The anonymous donation method begins at block 802 where a system provider device receives donor identity information and verifies the donor identity information. In an embodiment of block 802, a donor user of the donor device 702 may send donor identity information to the system provider device(s) 402 through the network 406, and the system provider device(s) 402 may receive that donor identity information and operate to verify the donor identity information. As discussed above, the donor user of the donor device 702 may operate in conjunction with the system provider and the system provider device(s) 402 according to the registration sub-method 100A such that the donor user uses the donor device 702 to provide donor user identification information to the system provider device(s) 402 at block 102; the system provider device(s) 702 generate a first donor user static key using the donor user identification information, and store the first donor user static key at block 104; the system provider device(s) 702 send the first registration public ledger address to the donor device 702 at block 105; the system provider device(s) 402 receive the second registration public ledger address from the donor device 702 at block 106; the system provider device(s) 402 retrieve a second donor user static key sent from the first registration public ledger address to the second registration public ledger address in a transaction in a public ledger at block 108; and the system provider device(s) 402 verify the second donor user static key using the first donor user static key to provide the verified donor user static key in the public ledger at block 110; all substantially as discussed above with regard to the registration sub-method 100A.

Furthermore, at block 802, the system provider device(s) 402 may then operate according to the modified block 112 of the registration sub-method 100A discussed above to associate the verified donor user static key with the donor user identification information received from the donor user via the donor device 702. As discussed above, this may involve applying a variety of regulatory compliance rules to the donor user identification information (e.g., KYC compliance rules), confirming a regulation verification of the donor user, and/or performing a variety of other actions on that donor user identification information that one of skill in the art in possession of the present disclosure would recognize would provide a verified donor user according to the teachings of the present disclosure Furthermore, as discussed in the example above, the donor user identification information for the donor user may be stored in association with the verified user static key for the donor user in a database of the system provider device(s) 402, and then subject to the verification processes discusses above when a payment or donation is requested by the donor user at block 806. Further still, as discussed in another of the examples above, the donor user identification information for the donor user may be used by the system provider device(s) 402 to perform the verification processes discussed above, and following the verification processes that donor user identification information may be discarded by the system provider device(s) 402 while the results of that verification process (e.g., a regulation-verification indicator) may be stored in association with the verified user static key for the donor user in a database of the system provider device(s) 402. As such, a verified user static key may be associated with a regulation verified donor user indicator (i.e., a KYC compliant donor user indicator) while the donor user identification information for the donor user has been discarded. Similarly, a verified user static key may be associated with a regulation non-verified donor user indication (i.e., a non-KYC compliant donor user indication) while the user identification information for that donor user has been discarded.

The method 800 then proceeds to block 804 where the system provider device receives donee identity information and verifies the donee identity information. In an embodiment of block 802, a donee user of the donee device 704 may send donee user identity information to the system provider device(s) 402 through the network 406, and the system provider device(s) 402 may receive that donee user identity information and operate to verify the donee user identity information. As discussed above, the donee user of the donee device 702 may operate in conjunction with the system provider device(s) 402 according to the registration sub-method 100A such that the donee user uses the donee device 702 to provide donee user identification information to the system provider device(s) 402 at block 102; the system provider device(s) 702 generate a first donee user static key using the donee user identification information, and store the first donee user static key at block 104; the system provider device(s) 702 send the first registration public ledger address to the donee device 702 at block 105; the system provider device(s) 402 receive the second registration public ledger address from the donee device 702 at block 106; the system provider device(s) 402 retrieve a second donee user static key sent from the first registration public ledger address to the second registration public ledger address in a transaction in the public ledger at block 108; and the system provider device(s) 402 verify the second donee user static key using the first donee user static key to provide the verified donee user static key in the public ledger at block 110; all substantially as discussed above with regard to the registration sub-method 100A.

Furthermore, at block 802, the system provider device(s) 402 may then operate according to the modified block 112 of the registration sub-method 100A discussed above to associate the verified donee user static key with the donee user identification information for the donee user. As discussed above, this may involve applying a variety of regulatory compliance rules to the donee user identification information (e.g., KYC compliance rules), confirming the status of the donee user as a 501(3)(c) entity via the Federal Charity Registry, checking charity rating websites such as Charity Navigator (www.charitynavigator.org), and/or performing a variety of other actions on the donee user identification information that one of skill in the art in possession of the present disclosure would recognize would provide a verified donee user according to the teachings of the present disclosure. Furthermore, as discussed in the example above, the donee user identification information for the donee user may be stored in association with the verified user static key for the donee user in a database of the system provider device(s) 402, and then subject to the verification processes discussed above when a payment or donation is requested by the donee user at block 806. Further still, as discussed in another of the examples above, the donee user identification information for the donee user may be used to perform the verification processes discussed above, and following the verification process that donee user identification information may be discarded by the system provider device(s) 402 while the results of that verification process may be stored in association with the verified user static key for the donee user in a database of the system provider device(s) 402. As such, a verified user static key may be associated with a regulation verified donee user indication (i.e., a KYC compliant donee user indication) while the donee user identification information for the regulation verified donee user has been discarded. Similarly, a verified user static key may be associated with a regulation non-verified donee user indication (i.e., a non-KYC compliant donee user indication) while the user identification information for that regulation non-verified donee user has been discarded by the system provider deivce(s) 402.

One of skill in the art in possession of the present disclosure will appreciate that, in some embodiments, block 804 of the method 800 may be skipped. For example, in many situations, the regulation verification of the donee user may be unnecessary, as the concern associated with the donation to the donee user is the regulation verification of the donor user. As such, in many embodiments of the method 800, the verification of the donee user may not be necessary (despite its performance or not at block 804) because the verification of that donee user is not used in the method 800. However, in some embodiments, the regulation verification of the donee user may be important to the donor user (i.e., to ensure that the donation is being provided to a KYC compliant donee user), and thus the verification of the donee user identification information may be performed at block 804 and utilized in the method 800 to, for example, verify to the donor user that the donee user is a regulation verified donee user (which may be performed in substantially the same manner as discussed below for verifying to the donee user that the donor user is a regulation verified donor user).

The method 800 then proceeds to block 806 where the donor device creates a multi-signature transaction that is directed to the donee and that includes the system provider as a signing party. In an embodiment, the donor user uses the donee device 702 to create a multi-signature crypto-currency transaction that is directed to the donee user and that includes the system provider as a signing party. One of skill in the art in possession of the present disclosure will recognize that the donor user may initiate a donation to the donee user by creating the multi-signature crypto-currency transaction that identifies an amount of funds to transfer, identifies the donee as the destination of the funds, and includes the system provider as a signing party. For example, the multi-signature crypto-currency transaction created at block 806 may require signatures using both of a private key available to the donor user and a private key available to the system provider in order for that crypto-currency transaction to transfer the identified funds from the donor user to the donee user. As such, the donor device 702 and/or the system provider device(s) 420 may gather (or generate) public ledger addresses on the donor device 702 and the system provider device(s) 402, obtain public keys from the donor device 702 and the system provider device(s) 402, and create a multi-signature crypto-currency transaction address for the multi-signature crypto-currency transaction. At block 806, the donor user may then create a crypto-currency transaction that identifies the donee user as a destination of funds, and send that transaction to the multi-signature crypto-currency transaction address. As discussed below, the multi-signature crypto-currency transaction may be used to verify the donor user at block 808. In some embodiment, a multi-signature crypto-currency transaction created for a first donation may then be used for verification of the donor user in a subsequent, second donation when, for example, the state of the donor user does not change and local regulations allow. However, in other embodiments a new multi-signature crypto-currency transaction may be created for each donation.

While the multi-signature crypto-currency transaction is discussed above as identifying an amount of donation funds for the donee user, in some embodiments, the multi-signature crypto-currency transaction may not identify the amount of donation funds for the donee user, and the amount of donation funds for the donee user may be provided by the donor user to the system provider device(s) 402 separately. For example, the donation by the donor user may be identified separately from the multi-signature crypto-currency transaction through a payment website provided by the system provider device(s) 402. In such embodiments, the multi-signature crypto-currency transaction may include a nominal amount of crypto-currency for transfer (e.g., 0.00000001 Bitcoins), and may be utilized below for the verification of the donor user rather than the transfer of funds from the donor user to the donee user.

The method 800 then proceeds to block 808 where the system provider device identifies the multi-signature transaction, verifies the identity of the donee, and signs the multi-signature transaction. In an embodiment, at block 808 the system provider device(s) 402 identify the multi-signature crypto-currency transaction created by the donor device at block 806. For example, the system provider device(s) 402 may identify the multi-signature crypto-currency transaction in response accessing a public ledger and determining that the donor device 702 has sent a transaction to a multi-signature crypto-currency transaction address that was created using a public ledger address and a public key of the system provider. Furthermore, the identification of the multi-signature crypto-currency transaction may include identifying a public ledger address of the donee user that was used (along with a public key of the donee) to create the multi-signature crypto-currency transaction address.

Block 808 may then proceed where the system provider device(s) 402 verify the identity of the donor user. In an embodiment, at block 808 the system provider device(s) 402 may operate according to portions of the authentication sub-method 100B discussed above to verify the identity of the donor user. For example, with reference to the authentication sub-method 100B in FIG. 1B, at block 114 the system provider device(s) 402 may determine the public ledger address of the donor user that was used to create the multi-signature crypto-currency transaction address (i.e., the first previous authentication public ledger address with reference to block 114 of the authentication sub-method 100B), along with the first current authentication public ledger address from the donor user device 702. The system provider device(s) 402 may then use the public ledger address of the donor user that was used to create the multi-signature crypto-currency transaction address (i.e., the first previous authentication public ledger address with reference to block 116 of the authentication sub-method 100B) to access the verified user static key for the donor user in the public ledger at block 116. Similarly as discussed above, then system provider device(s) 402 may then provide the second current authentication public ledger address to the donor user device 702 at block 118, determine authentication attempt information at block 120, generate the first donor use authentication key using the authentication attempt information and the verified user static key of the donor user at block 122, retrieve a second user authentication key sent from the first current authentication public ledger address to the second current authentication public ledger address in a transaction on the public ledger at block 124, and verify the donor user if the second user authentication key matches the first user authentication key.

If the second user authentication key matches the first user authentication key according to the authentication sub-method 100B as discussed above, the system provider device(s) 402 confirms that the multi-signature crypto-currency transaction identified at block 808 is associated with the verified user static key. Furthermore, as discussed above, that verified user static key may have been previously associated with donor user identification information and/or a regulation verified donor user indication, and thus the system provider device(s) 402 may confirm whether the donor user that created the multi-signature crypto-currency transaction is a regulation verified user (e.g., a KYC regulation compliant user).

If the system provider device(s) 402 determine that the donor user is a regulation verified user, block 808 may proceed with the system provider device signing the multi-signature crypto-currency transaction. For example, the system provider device(s) may include rules (e.g., default rules, rules provided by the donee user, etc.) that indicate that the multi-signature crypto-currency transaction should be signed when the donor user is a regulation verified user. If the system provider device(s) 402 determine that the donor user is not a regulation verified user, block 808 may proceed with the system provider device not signing the multi-signature crypto-currency transaction. For example, the system provider device(s) may include rules (e.g., default rules, rules provided by the donee user, etc.) that indicate that the multi-signature crypto-currency transaction should not be signed when the donor user is a not a regulation verified user. However, in some embodiments, the determination that the donor use is not a regulation verified user may still result in the system provider device(s) 402 signing the multi-signature crypto-currency transaction. For example, the system provider device(s) 402 may determine that the donor user is not a regulation verified user, sign the multi-signature crypto-currency transaction, and then inform the donee user (as discussed below in block 810) that the donor user is a not a regulation verified user.

The method 800 then proceeds to block 810 where the system provider device transfers funds from the donor to the donee and sends a notification to the donee device. In an embodiment, subsequent to the verification of the identity of the donor user, the system provider device(s) 402 may perform operations to cause the transfer of funds from the donor user to the donee user. In one example, the signing of the multi-signature crypto-currency transaction by the system provider causes the transfer of funds associated with an address on the public ledger that is controlled (e.g., via a private key) by the donor user to an address on the public ledger that is controller (e.g., via a private key) by the donee user. As such, in some embodiments, the multi-signature crypto-currency transaction is configured, in addition to allowing the verification of the donor user, to transfer funds in response to being signed by each of the donor user and the system provider. However, in other examples, at block 810 the system provider device(s) 402 may operate to transfer funds from a donor user account of the donor user (e.g., provided by the system provider and/or a payment provider) to a donee user account of the donee user (e.g., provided by the system provider and/or a payment provider) separate from the signing of the multi-signature crypto-currency transaction. As such, the multi-signature crypto-currency transaction signed by the donor user and the system provider may be for a nominal amount (e.g., 0.00000001 Bitcoins), and may primarily be used for the verification of the donor user, while the donation specified by the donor user (e.g., via a payment account) may be realized via a separate fund transfer between accounts provided to the donor user and the donee user.

Furthermore, at block 810, the system provider device(s) 402 may operate to send a notification to the donee device 704. In an embodiment, at block 810, the system provider device 402 may generate a notification about the fund transfer from the donor user to the donee user and send that notification to the donee user via the donee device 704 (e.g., in an email, as an application notification, via conventional mail, etc.). For example, the notification send by the system provider device(s) 402 to the donee device 704 at block 810 may identify the amount of the donation from the donor user to the donee user, an indication of whether the donor user has been regulation verified, and/or any of a variety of other information other than donor user identification information that would be relevant to the donee user. As discussed above, some donee users may have specified that they will only accept donations from regulation verified donor users and thus the system provider device(s) 402 may only transfer the funds from the donor user to the donee user and send a notification of transferred funds when those funds are transferred from a regulation verified user at blocks 808 and 810. In some embodiments, notifications at block 810 may include a notification sent from the system provider device(s) 402 to a regulatory agency device operated by the regulatory agency. As such, funds may be transferred from a donor user to a donee user anonymously in that the donee user does not have access to donor user identification information about the donor user, and the system provider prevents any donor user identification information from being released with the transfer of funds as per the donation.

The method 800 may then proceed to optional block 812 where the donee device verifies the system provider device using an address in the multi-signature transaction. In some embodiments, the system provider device(s) 402 and the donee device 704 may have previously utilized the registration sub-method 100A to allow the donee user to verify the identity of the system provider. As such, with reference to the registration sub-method 100A, the donee device 704 may have previously received system provider identity information and verified the system provider identity information at block 102; generated a first system provider static key using the system provider identification, and stored the first system provider static key at block 104; sent the first registration public ledger address to the system provider device(s) 402 at block 105; received the second registration public ledger address from the system provider device(s) 402 at block 106; retrieved a second system provider static key sent from the first registration public ledger address to the second registration public ledger address in a transaction in the public ledger at block 108; and verified the second system provider static key using the first system provider static key to provide the verified system provider static key in the public ledger at block 110; all substantially as discussed above with regard to the registration sub-method 100A. Furthermore, at optional block 812, the donee device 704 may have operated according to a modified block 112 of the registration sub-method 100A to associate the verified system provider static key with the system provider identification information for the system provider.

Thus, at optional block 812, the donee device 704 may then operate according to the authentication sub-method 100B to verify the system provider using the address in the multi-signature crypto-currency transaction. In an embodiment, at optional block 812, the donee device 704 identifies the multi-signature crypto-currency transaction signed by the donor device 702 and the system provider device(s) 402. For example, the identification of the multi-signature crypto-currency transaction may include identifying a public ledger address of the system provider that was used (along with a public key of the system provider) to create the multi-signature crypto-currency transaction address of the multi-signature crypto-currency transaction that is included in the public ledger.

Optional block 812 may then proceed where the donee device 704 verifies the identity of the system provider. In an embodiment, at optional block 812, the donee device 704 may operate according to portions of the authentication sub-method 100B to verify the identity of the system provider. For example, with reference to the authentication sub-method 100B in FIG. 1B, at block 114 the donee device 704 may determine the public ledger address of the system provider that was used to create the multi-signature crypto-currency transaction address (i.e., the first previous authentication public ledger address with reference to block 114 of the authentication sub-method 100B), along with the first current authentication public ledger address from the system provider device(s) 402. The donee device 704 may then use the public ledger address of the system provider that was used to create the multi-signature crypto-currency transaction address (i.e., the first previous authentication public ledger address with reference to block 116 of the authentication sub-method 100B) to access the verified system provider static key for the system provider in the public ledger at block 116. Similarly as discussed above, then donee device 704 may then provide the second current authentication public ledger address to the system provider device(s) 402 at block 118; determine authentication attempt information at block 120; generate the first system provider authentication key using the authentication attempt information and the verified system provider static key of the system provider at block 122; retrieve a second system provider authentication key sent from the first current authentication public ledger address to the second current authentication public ledger address in a transaction on the public ledger at block 124; and verify the system provider if the second system provider authentication key matches the first system provider authentication key.

If the second system provider authentication key matches the first system provider authentication key according to the authentication sub-method 100B as discussed above, the donee device 704 confirms that the multi-signature cryptocurrency transaction identified at optional block 812 is associated with the verified system provider static key. Furthermore, as discussed above, that verified system provider static key may have been previously associated with system provider identification information, and thus the donee device 702 may confirm that the system provider is a trusted party.

If the donee device 704 determines that the system provider is a trusted party, optional block 812 may proceed with the donee user accepting the donation (i.e., the funds transferred by the system provider from the donor user to the donee user.) However, in some embodiments, the determination that the system provider is not a trusted party may result in the donee user rejecting the donation, or in some cases requesting that the system provider perform the registration sub-method 100A in order to become a trusted party.

In some embodiments, the system provider device(s) 402 may provide the donee device 704 an anonymous donor user tracking number that does not include identification information about the donor user. For example, anonymous donor user tracking numbers may be provided for tracking purposes by the donee, and may include indications of whether the donee is allowed to provide subsequent communications to the donor user. In specific examples, that anonymous donor tracking number may be utilized by the donee user with subsequent communications sent to the system provider device(s) 402, and the system provider device(s) 402 may forward those communications to the donor user using the anonymous donor user tracking number (i.e., based on a link between the anonymous donor tracking number and the "real" identity of the donor user).

Thus, a donor/payer users are enabled to make anonymous donations/payments to donee/payee users via a system provider, and the donee/payee users may accept the donations/payments with the assurance of the system provider that the donor/payer is a regulation verified user. The verifications of parties in the system, as well as the donations/payments in many embodiments, may be enabled via a public ledger such as, for example, the Bitcoin Blockchain, and the system provider may act as a trusted party that operate to regulation-verify donor users (e.g., ensure that the donor users are KYC regulation compliant) and ensure the donee users of that regulation verification when anonymously transferring donations/payments from the donor user to the donee user. One of skill in the art in possession of the present disclosure will recognize that providing donors/payers the ability to donate/pay anonymously while ensuring donees/payees that the donation/payment is from a regulation verified party may lead to more donations/payments that can increase funds available to charities, as well as increase the use of payment networks relative to to those that provide conventional donation/payment functionality.

One of skill in the art in possession of the present disclosure will recognize that a variety of modifications to the systems and methods discussed above with fall within the scope of the present disclosure. In some embodiments, the method 800 may begin with the donee user soliciting donations from anonymous donors via the system provider. For example, the donee user may begin a donation campaign via a website provided by the system provider (e.g., by specifying the donation cause, suggested donations amounts, etc.), and the system provider may act as an intermediary to receive anonymous donations from the donor users and provide them to the donee user via the systems and methods discussed above. In some embodiments, donor users may provide the system provider preferences and/or profiles that indicate which donation solicitations they would like to receive from donee users via the system provider.

Furthermore, some embodiments may involve the system provider verifies the identity of donor/donee matching services, which allows donor users to be matched with donee users while both the donor users and donee users remain anonymous to each other (but the donor user and donor/donee matching service will be known to each other.) In such situations, the system provider may report the donor/donee matching service, the donor, the donee, and information associated with the donor/donee matching, to regulatory systems as required by local laws.

Figure 9:
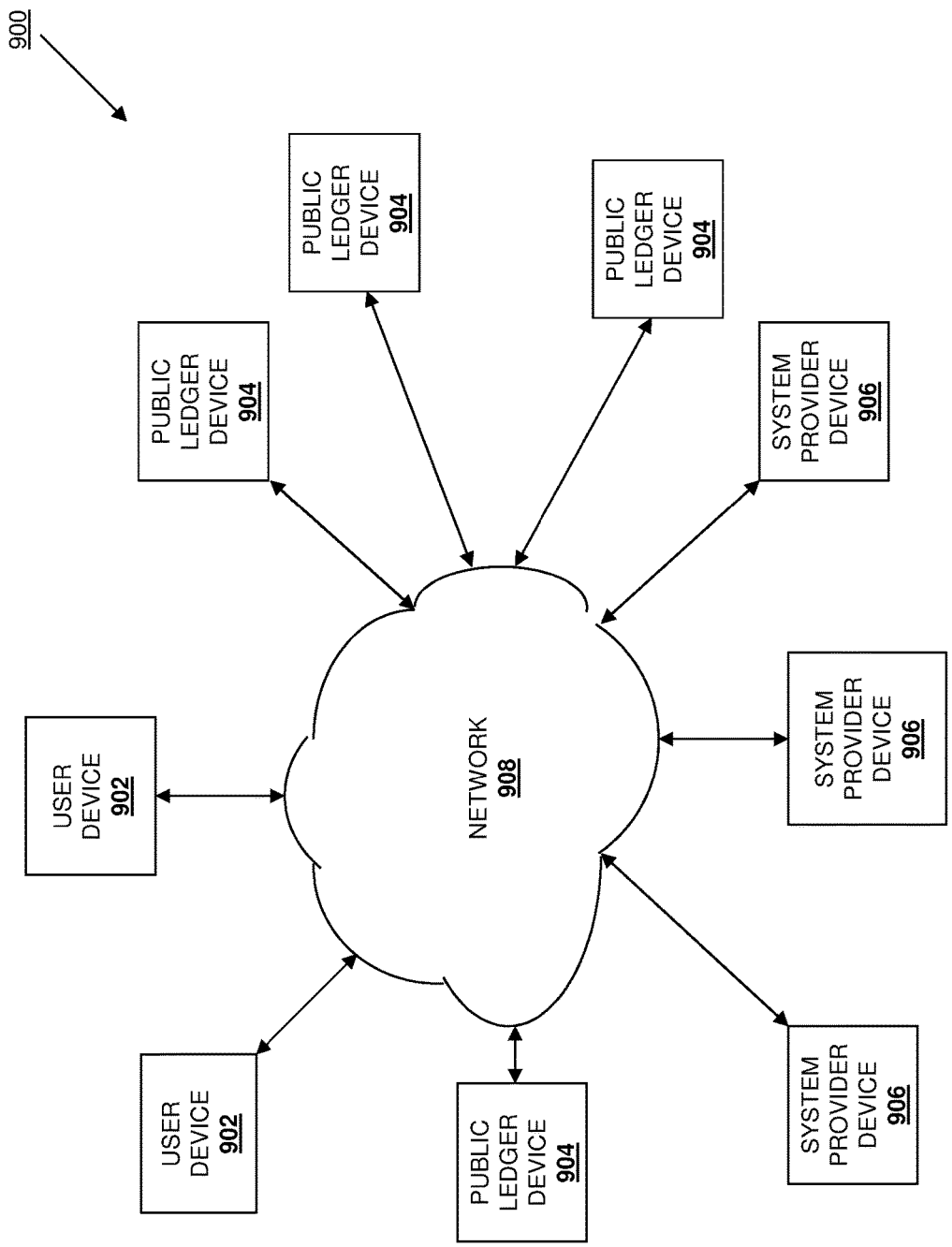
FIG. 9 is a schematic view illustrating an embodiment of a networked system.

Referring now to FIG. 9, an embodiment of a networked system 900 used in the public ledger authentication system 400 described above is illustrated. The networked system 900 includes a plurality of user devices 902, a plurality of public ledger devices 904, and a plurality of system provider devices 906 in communication over a network 908. Any of the user devices 902 may be the user devices operated by the users, discussed above. Any of the public ledger devices 904 may be the public ledgers devices discussed above. Any of the system provider devices 906 may be the system provider devices operated by the system providers, discussed above.

The user devices 902, public ledger devices 904, and/or system provider devices 906 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 908.

The network 908 may be implemented as a single network or a combination of multiple networks. For example, in various embodiments, the network 908 may include the Internet and/or one or more intranets, landline networks, wireless networks, and/or other appropriate types of networks.

The user devices 902 may be implemented using any appropriate combination of hardware and/or software configured for wired and/or wireless communication over network 908. For example, in one embodiment, the user devices 902 may be implemented as a personal computer of a user in communication with the Internet. In other embodiments, the user devices 902 may be a smart phone, wearable computing device, laptop computer, and/or other types of computing devices.

The user devices 902 may include one or more browser applications which may be used, for example, to provide a convenient interface to permit the payer to browse information available over the network 908. For example, in one embodiment, the browser application may be implemented as a web browser configured to view information available over the Internet.

The user devices 902 may also include one or more toolbar applications which may be used, for example, to provide user-side processing for performing desired tasks in response to operations selected by the user. In one embodiment, the toolbar application may display a user interface in connection with the browser application.

The user devices 902 may further include other applications as may be desired in particular embodiments to provide desired features to the user devices 902. In particular, the other applications may include a payment application for payments assisted by a payment service provider. The other applications may also include security applications for implementing user-side security features, programmatic user applications for interfacing with appropriate application programming interfaces (APIs) over the network 908, or other types of applications. Email and/or text applications may also be included, which allow the user to send and receive emails and/or text messages through the network 908. The user devices 902 include one or more user and/or device identifiers which may be implemented, for example, as operating system registry entries, cookies associated with the browser application, identifiers associated with hardware of the user devices 902, or other appropriate identifiers, such as a phone number. In one embodiment, the user identifier may be used to associate the user with a particular account as further described herein.

Figure 10:
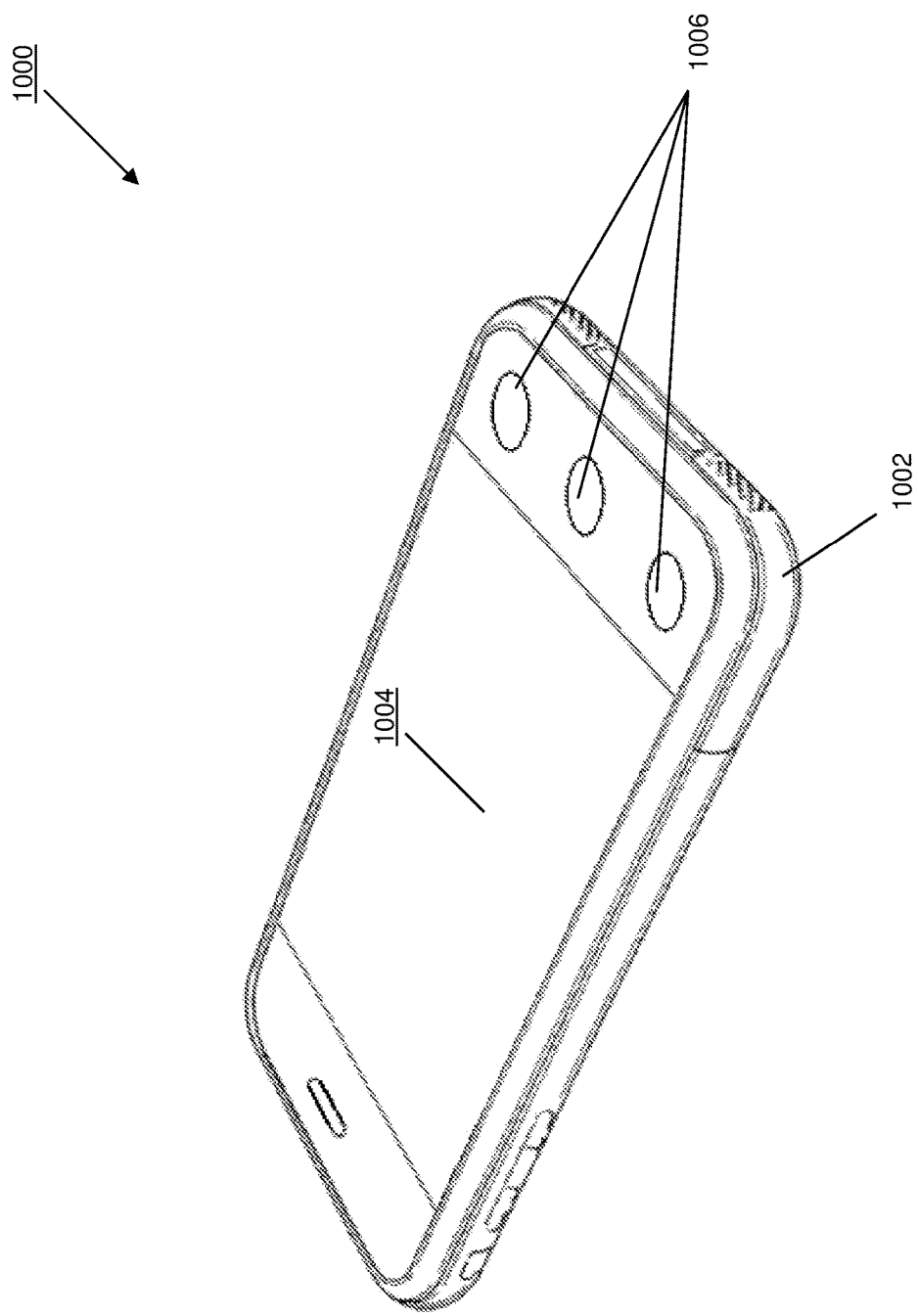
FIG. 10 is a perspective view illustrating an embodiment of a user device.

Referring now to FIG. 10, an embodiment of a user device 1000 is illustrated. The device 1000 may be any of the user devices discussed above. The device 1000 includes a chassis 1002 having a display 1004 and an input device including the display 1004 and a plurality of input buttons 1006. One of skill in the art will recognize that the device 1000 is a portable or mobile phone including a touch screen input device and a plurality of input buttons that allow the functionality discussed above with reference to the method 100. However, a variety of other portable/mobile devices and/or desktop devices may be used in the method 100 without departing from the scope of the present disclosure.

Figure 11:
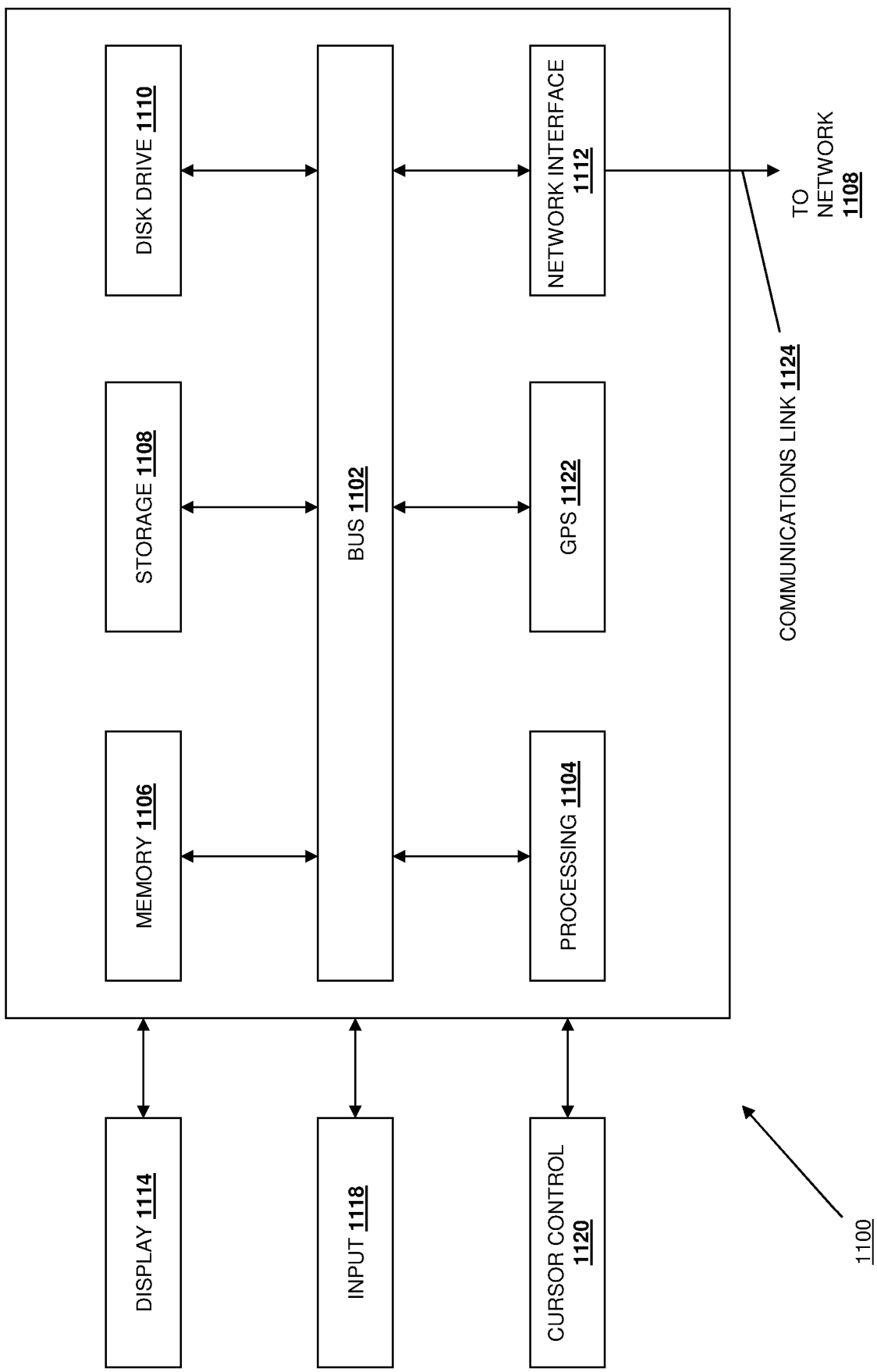
FIG. 11 is a schematic view illustrating an embodiment of a computer system.

Referring now to FIG. 11, an embodiment of a computer system 1100 suitable for implementing, for example, the user devices, public ledger devices, and/or system provider devices, is illustrated. It should be appreciated that other devices utilized in the public ledger authentication system discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1008 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), and/or a location determination component 1122 (e.g., a Global Positioning System (GPS) device as illustrated, a cell tower triangulation device, and/or a variety of other location determination devices known in the art). In one implementation, the disk drive component 1110 may comprise a database having one or more disk drive components.

In accordance with embodiments of the present disclosure, the computer system 1100 performs specific operations by the processor 1104 executing one or more sequences of instructions contained in the memory component 1106, such as described herein with respect to the payer devices, payee devices, user devices, payment service provider devices, and/or system provider devices. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 908 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 912 may include an antenna, either separate or integrated, to enable transmission and reception via the communication link 1124. Received program code may be executed by processor 1104 as received and/or stored in disk drive component 1110 or some other non-volatile storage component for execution.

Figure 12:
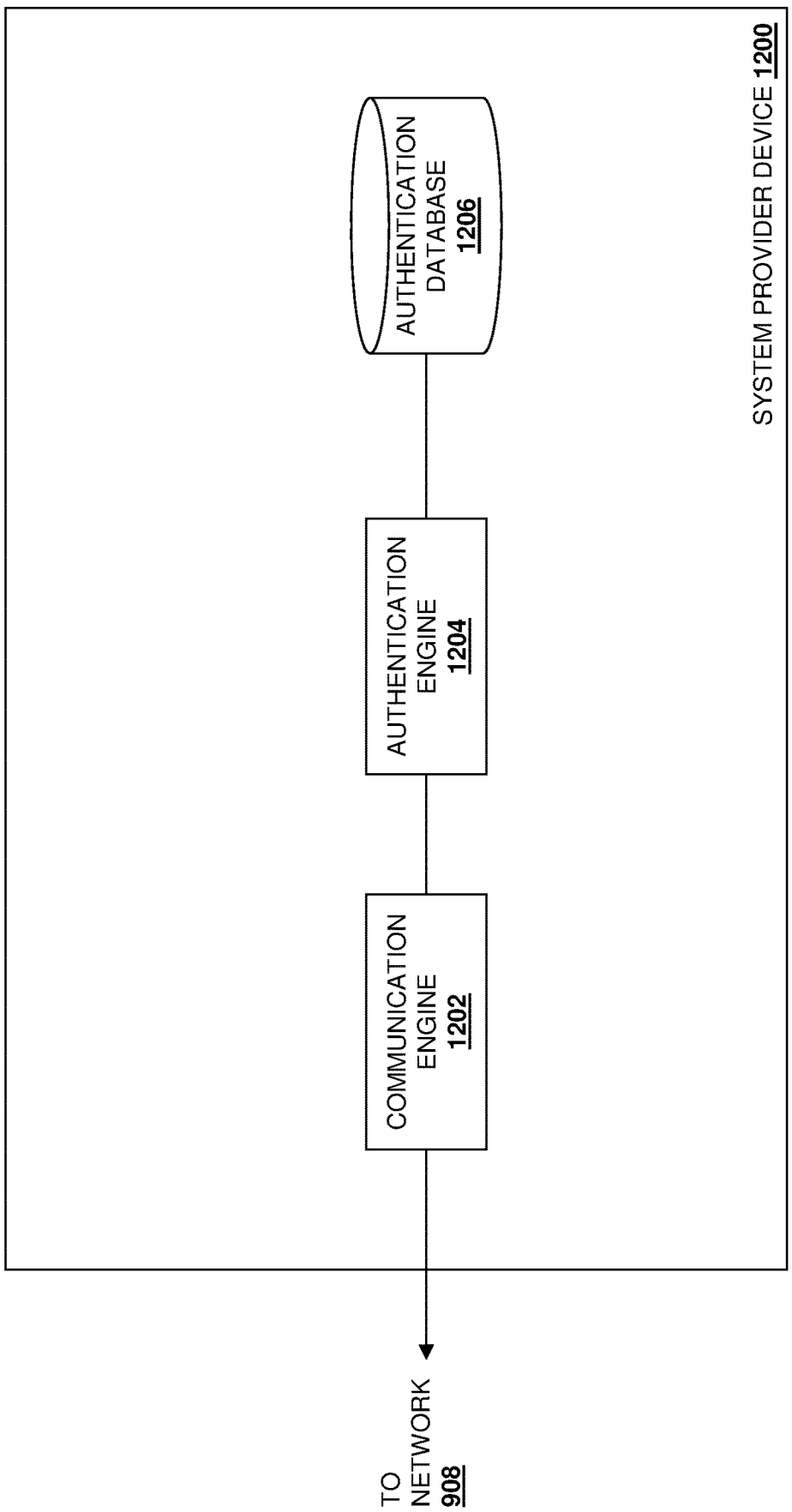
FIG. 12 is a schematic view illustrating an embodiment of a system provider device.

Referring now to FIG. 12, an embodiment of a system provider device 1200 is illustrated. In an embodiment, the device 1200 may be any of the system provider devices discussed above. The device 1200 includes a communication engine 1202 that is coupled to the network 908 and to an authentication engine 1204 that is coupled to an authentication database 1206. The communication engine 1202 may be software or instructions stored on a computer-readable medium that allows the device 1200 to send and receive information over the network 908. The authentication engine 1204 may be software or instructions stored on a computer-readable medium that is configured to perform the registration, authentication, and/or any of the other functionality that is discussed above. While the authentication database 1206 has been illustrated as a single database located in the device 1200, one of skill in the art will recognize that it may include multiple databases and be connected to the authentication engine 1204 through the network 908 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    one or more processors; and
    one or more machine-readable storage media having instructions stored thereon that, in response to being executed by the one or more processors, cause the system to perform operations comprising:
        receiving a request to process a transaction on a public ledger;
        accessing a verified user static key stored on the public ledger and associated with user identification information that was used in previous transactions and stored in a database, wherein the verified user static key has been verified by verifying the user identification information and public ledger addresses of the public ledger used in the previous transactions;
        performing a regulation verification process to verify a user by accessing a user account provided in the user identification information to determine a risk of the user failing the transaction based on transactional records associated with the user account;
        determining that the risk passes a threshold set in the regulation verification process and obtaining a result of performing the regulation verification process based on the risk, wherein the result of performing the regulation verification process is obtained based in part on the user identification information and the verified user static key on the public ledger;
        based on the risk, processing the transaction;
        associating the result of performing the regulation verification process with the verified user static key;
        storing the result of performing the regulation verification process in the database; and
        discarding the user identification information from the database.

2. The system of claim 1, wherein the operations further comprise:
    verifying, an identity of the user associated with the transaction, wherein the verifying includes performing a hash operation.

3. The system of claim 1, wherein the request includes the public ledger addresses used in the previous transactions.

4. The system of claim 1, wherein the public ledger addresses are obtained from a transaction wallet associated with the user.

5. The system of claim 1, wherein the public ledger addresses include access to amounts and information associated with the previous transactions.

6. The system of claim 1, wherein the determining includes assessing a fraud or a credit risk of the user.

7. The system of claim 1, wherein in response to the determining, a transaction insurance is presented.

8. The system of claim 2, wherein the hash operation includes a generation and an exchange of first and second static keys.

9. A method comprising:
    determining, a risk associated with a transaction request received by performing a regulation verification process to verify a user associated with the transaction request, wherein performing the regulation verification process comprises:
        accessing a user account with user identification information that was used in previous transactions and stored in a database to determine a risk of the user failing the transaction request based on transactional records associated with the user account; and
        in response to the determining, obtaining a result of performing the regulation verification process based in part on the user identification information and a verified user static key stored on a public ledger and associated with the user identification information, wherein the verified user static key has been verified by verifying the user identification information and public ledger addresses of the public ledger used in the previous transactions a plurality of transactions on a public ledger;
    in response to determining the risk associated with the transaction request, transmitting a risk score to a service provider;
    presenting an insurance associated with the transaction request;
    associating the result of performing the regulation verification process with the verified user static key;
    storing the result of performing the regulation verification process in the database; and
    discarding the user identification information from the database.

10. The method of claim 9, further comprising:
    verifying, an identity of the user associated with the transaction request, wherein the verifying includes performing a hash operation.

11. The method of claim 9, wherein the transaction request includes the public ledger addresses used in the previous transactions.

12. The method of claim 9, wherein the public ledger addresses are obtained from a transaction wallet associated with the user.

13. The method of claim 9, wherein the public ledger addresses include access to amounts and information associated with the previous transactions.

14. The method of claim 9, wherein the determining includes assessing a fraud or a credit risk of the user.

15. The method of claim 10, wherein the hash operation includes a generation and an exchange of first and second static keys.

16. A non-transitory machine-readable medium having stored thereon machine-readable instructions executable to cause a machine to perform operations comprising:
    receiving a request to process a transaction on a public ledger;
    accessing a verified user static key stored on the public ledger and associated with user identification information that was used in previous transactions and stored in a database, wherein the verified user static key has been verified by verifying the user identification information and public ledger addresses of the public ledger used in the previous transactions;
    performing a regulation verification process comprising:
        accessing a user account provided in the user identification information; and
        determining a risk of a user associated with the user account failing the transaction based on transactional records associated with the user account;
    verifying, based on the performing, the user;
    determining that the risk passes a threshold set in the regulation verification process;
    obtaining a result of performing the regulation verification process based on the risk, wherein the result of performing the regulation verification process is obtained is based in part on the user identification information and the verified user static key on the public ledger;
    based on the risk, processing the transaction;
    associating the result of performing the regulation verification process with the verified user static key;
    storing the result of performing the regulation verification process in the database; and
    discarding the user identification information from the database.

17. The non-transitory machine-readable medium of claim 16, wherein the operations further comprise:
    verifying, an identity of the user associated with the transaction, wherein the verifying includes performing a hash operation.

18. The non-transitory machine-readable medium of claim 16, wherein the request includes the public ledger addresses used in the previous transactions.

19. The non-transitory machine-readable medium of claim 16, wherein the public ledger addresses are obtained from a transaction wallet associated with the user.

20. The non-transitory machine-readable medium of claim 16, wherein the public ledger addresses include access to amounts and information associated with the previous transactions.

* * * * *